US011935366B2

(12) United States Patent
Flores et al.

(10) Patent No.: US 11,935,366 B2
(45) Date of Patent: Mar. 19, 2024

(54) BINGO GAME METHOD AND SYSTEM HAVING OUTCOMES DETERMINED BY INDEPENDENT GAME EVENTS

(71) Applicant: Entain Operations Limited, Europort Avenue (GI)

(72) Inventors: Karl Flores, Sydney (AU); Daniel Rudolph, Berlin (DE)

(73) Assignee: ENTAIN OPERATIONS LIMITED, Europort Avenue (GI)

( * ) Notice: Subject to any disclaimer, the term of this patent is extended or adjusted under 35 U.S.C. 154(b) by 0 days.

(21) Appl. No.: 17/180,214

(22) Filed: Feb. 19, 2021

(65) Prior Publication Data

US 2021/0264740 A1 Aug. 26, 2021

Related U.S. Application Data

(60) Provisional application No. 62/980,049, filed on Feb. 21, 2020.

(51) Int. Cl.
*G07F 17/32* (2006.01)

(52) U.S. Cl.
CPC ...... *G07F 17/3295* (2013.01); *G07F 17/3227* (2013.01)

(58) Field of Classification Search
CPC ......................... G07F 17/3295; G07F 17/3227
See application file for complete search history.

(56) References Cited

U.S. PATENT DOCUMENTS 6,296,250 B1 * 10/2001 Langan ............... A63F 3/00028 273/139
2003/0119573 A1 * 6/2003 McClintic ........... G07F 17/3295 463/16
2004/0152499 A1 * 8/2004 Lind ....................... G07F 17/32 463/16
2005/0098950 A1 * 5/2005 Yamaguchi ............. A63F 3/062 273/269
2009/0061978 A1 * 3/2009 Ahlin ..................... G06Q 30/02 463/16
2012/0122561 A1 * 5/2012 Hedrick .................. A63F 13/35 463/25
2014/0032639 A1 1/2014 Trousdell et al.
2020/0380812 A1 * 12/2020 Nelson .................. G07F 17/329

FOREIGN PATENT DOCUMENTS

WO 2012/162836 A1 12/2012

* cited by examiner

*Primary Examiner* — Kevin Y Kim
(74) *Attorney, Agent, or Firm* — Dorsey & Whitney LLP

(57) ABSTRACT

Providing, hosting, and playing a bingo game associated with real or virtual events occurring independently, which may be randomly occurring or skill-based, real or virtual events occurring in real-time, such as those occurring in sporting events or one or more video games being played by one or more players, which may be human players playing or a computer player using artificial intelligence.

32 Claims, 24 Drawing Sheets

FIG. 5G
FIG. 5H
Unikrn
7:15 AM
100%
BINGO
Privacy Policy
The Unikrn Website (the "website") uses cookies to deliver a better and more personalised service to users. This Cookies Policy explains what cookies cookies are, how they are used on the website and how to manage their use.
What is a Cookie?
Cookies are small text files containing small amounts of information which are sent to and stored on your computer, smartphone or other device when you access a website. Cookies are then sent back to the originating website on each subsequent visit or to another website that recognises that cookie. Cookies are Useful because they allow a website to recognise a user's device.
You can find more information about cookies at
www.allaboutcookies.org
Unikrn
7:15 AM
100%
BINGO
Terms of Service
1. Acceptance of Terms
Welcome to https://unikrn.com/ ("UNIKRN"), owned and operated by Unikrn, Inc. UNIKRN provides its services to you, subject to the following Terms of Service ("TOS"), which may be updated by us from time to time without notice to you. You can review the most current version of the TOS at any time at this page. In addition, when using particular UNIKRN services, you and UNIKRN shall be subject to any posted guidelines or rules applicable to such services, which may be posted elsewhere on the website. All such guidelines or rules are hereby incorporated by reference into these TOS.
1. Acceptance of Terms
UNIKRN provides users with a fun arena to gather and participate in games, contests, and other products related to esports including by earning,

BINGO GAME METHOD AND SYSTEM HAVING OUTCOMES DETERMINED BY INDEPENDENT GAME EVENTS

BACKGROUND

Technical Field

The present disclosure relates to the field of gaming, particularly to the field of video games involving real or virtual events occurring independently in a sports environment.

Description of the Related Art

Gaming establishments, casinos, and non-casino sporting environments continually are trying to create or identify new games to offer their players. However, most of the electronic games offered by casinos or other gaming establishments/websites are versions or modifications of games which have been around for decades. In contrast, video games have benefited from significant innovation and sales have exploded as a result. Video game sales are now estimated to generate over 20 billion dollars per year, whereas casino revenues have dropped over the last decade. Consequently, casinos and other gaming establishments/web sites would benefit by offering new real-time video games that appeal to video game players and to younger players who do not find casino games, such as slot machines, appealing.

Naturally, gaming operators seek to provide the most popular games for their gaming patrons. Therefore, there is a need for new video games which appeal to the video game player while also providing financial benefit to a casino or other gaming establishments/web sites.

BRIEF SUMMARY

The present disclosure is directed to systems and methods of providing, hosting and playing a bingo mobile game associated with real or virtual events occurring independently, which may be randomly occurring or skill-based, real or virtual events occurring in real-time, such as those occurring in one or more video games being played by one or more players, which may be human players playing or a computer player using artificial intelligence.

An in-game bingo system may be summarized as including a network; a central gaming server; a game controller; and one or more user devices, wherein the central gaming server, the game controller, and the one or more user devices are communicatively coupled by the network, and wherein the central gaming server includes a memory having instructions stored thereon that when executed by a game processor, cause the game processor to: assign a virtual bingo card to each of one or more user devices, each virtual bingo card containing a plurality of cells, each cell being associated with at least one possible occurrence of an in-game event in a sporting event; receive event occurrence data from an in-game event server that receives data regarding actual occurrences of in-game events during the sporting event; record cell locations on the bingo cards of each player if the cells associated with possible occurrences match actual occurrences identified by the event occurrence data; and compare the recorded cell locations to a preset winning pattern of cells to determine if a preset winning pattern is achieved. The sporting event may be selected from one or more of: basketball, football, XFL, Rugby, golf, soccer, hockey, Mixed Martial Arts/Ultimate Fighting Championship, and tennis.

Intra-game data from the sporting event may include one or more of: first team lineup change, second team lineup change, a result of an interaction between two opposing players, any scoring attempt, any successful scoring event, any unsuccessful scoring event, a specific scoring attempt by any player, a specific successful scoring event by any player, a specific unsuccessful scoring event by any player, a specific scoring attempt by a specific player, a specific successful scoring event by a specific player, a specific unsuccessful scoring event by a specific player, any defensive attempt, any successful defensive event, any unsuccessful defensive event, a specific defensive attempt by any player, a specific successful defensive event by any player, a specific unsuccessful defensive event by any player, a specific defensive attempt by a specific player, a specific successful defensive event by a specific player, a specific unsuccessful defensive event by a specific player, any penalty, a specific penalty by any player, a specific penalty by a specific player, a non-scoring attempted play, a successful non-scoring play, an unsuccessful non-scoring play, a specific non-scoring attempted play, a specific successful non-scoring play by any player of a first team, a specific unsuccessful non-scoring play by any player of a first team, a specific non-scoring play by a specific player, a specific successful non-scoring play by a specific player, and a specific unsuccessful non-scoring play by a specific player.

Intra-game data from a particular sporting event, such as basketball may include one or more of: two point jump shot attempt with or without respect to a particular player, two point jump shot success with or without respect to a particular player, two point jump shot miss with or without respect to a particular player, three point jump shot attempt with or without respect to a particular player, three point jump shot success with or without respect to a particular player, three point jump shot miss with or without respect to a particular player, two point dunk attempt with or without respect to a particular player, two point dunk success with or without respect to a particular player, two point dunk miss with or without respect to a particular player, assist with or without respect to a particular player, assist with or without respect to a particular player in combination with any other event in this list, turnover with or without respect to a particular player, turnover with or without respect to a particular player due to lost ball, turnover with or without respect to a particular player due to bad pass, turnover with or without respect to a particular player due to travelling, turnover with or without respect to a particular player due to double dribble, steal with or without respect to a particular player, three point jump shot attempt with or without respect to a particular player, three point jump shot success with or without respect to a particular player, three point jump shot miss with or without respect to a particular player, two point driving layup attempt, two point driving layup success, two point driving layup miss, defensive rebound with or without respect to a particular player, offensive rebound with or without respect to a particular player, out of bounds stoppage, delay of game violation, two point putback layup attempt with or without respect to a particular player, two point putback layup success with or without respect to a particular player, two point putback layup miss with or without respect to a particular player, goaltending violation with or without respect to a particular player, two point alley-oop dunk attempt with or without respect to a particular player, two point alley-oop dunk success with or without respect to a particular player, two point alley-oop dunk miss with or without respect to a particular player, timeout by a first team, timeout by a second team, two point driving dunk attempt with or without respect to a particular player, two point driving dunk success with or without respect to a particular player, two point driving dunk miss with or without respect to a particular player, drawing a non-shooting foul with or without respect to a particular player, drawing a shooting foul with or without respect to a particular player, making a shooting foul with or without respect to a particular player, missing a shooting foul with or without respect to a particular player, making two free throws with or without respect to a particular player, missing regular free throw 1 of 2 with or without respect to a particular player, missing regular free throw 2 of 2 with or without respect to a particular player, two point finger roll layup attempt with or without respect to a particular player, two point finger roll layup success with or without respect to a particular player, two point finger roll layup miss with or without respect to a particular player, drawings a personal foul with or without respect to a particular player, attempt a regular free throw 1 of 1 with or without respect to a particular player, make a regular free throw 1 of 1 with or without respect to a particular player, miss a regular free throw 1 of 1 with or without respect to a particular player, stoppage for an equipment malfunction with or without respect to a particular player, instant replay upholding call, and instant replay overturning call.

It will be understood that game-specific intra-game data from other sports besides basketball may be used with respect to other sports to incorporate into the bingo cells associated with possible occurrences of an event in the underlying sports game (e.g., football, baseball, soccer, tennis, hockey, golf, and the like).

The card may be assigned randomly. The card may include a grid containing a plurality of cells with each cell being associated with a possible occurrence of an event in an underlying game. The event occurrence data may include an identification of an actual occurrence in an underlying game. An award may be a prize allocated to an underlying game. The one or more user devices may be a handheld mobile device a display. An underlying game may be a sporting event, a match, a competition, or a video game.

A gaming system may be summarized as including a network; a central gaming server; a game processor; and one or more user devices, wherein the central gaming server, the game controller, and the one or more user devices are communicatively coupled by the network, and wherein the central gaming server includes a memory having instructions stored thereon that when executed by the game processor, cause the game processor to: receive at least one input from one or more user devices; assign a virtual bingo card to each of the one or more user devices, each virtual bingo card containing a plurality of cells, each cell being associated with at least one possible occurrence of an in-game event in a sporting event; receive event occurrence data from an in-game event server that receives data regarding actual occurrences of in-game events during the sporting event; record cell locations on the bingo cards of each player if the cells associated with possible occurrences match actual occurrences identified by the event occurrence data; compare the recorded cell locations to a preset winning pattern of cells to determine if a preset winning pattern is achieved; and facilitate a delivery of an award to a player having a bingo card which achieved the preset winning pattern.

The central gaming server may include a memory having instructions stored thereon that when executed by the game processor, and may further cause the game processor to: receive at least one wager input from each of the one or more user devices. The card may be assigned randomly. The card may include a grid containing a plurality of cells with each cell being associated with a possible occurrence of an event in an underlying game. The event occurrence data may include an identification of an actual occurrence in an underlying game. The award may be a prize allocated to an underlying game. The one or more user devices may be a handheld mobile device including a display. The sporting event may be a match, a competition, or a video game.

A method for conducting in-game bingo system based on event occurrence data of a game may be summarized as including receiving at least one input from one or more user devices; assigning a virtual bingo card to each of the one or more user devices, each virtual bingo card containing a plurality of cells, each cell being associated with at least one possible occurrence of an in-game event in a sporting event; receiving event occurrence data from an in-game event server that receives data regarding actual occurrences of in-game events during the sporting event; recording a location on the virtual bingo card of each of the one or more user devices based on an occurrence that matches an actual occurrence identified by the event occurrence data; comparing all the recorded locations to a preset winning pattern of cells to determine if the preset winning pattern is achieved; and facilitating a provision of an award to any of the one or more user devices having a card that matches the preset winning pattern.

The card may be assigned randomly. The card may include a grid containing a plurality of cells with each cell being associated with a possible occurrence of an event in an underlying game. The event occurrence data may include an identification of an actual occurrence in an underlying game. The award may be a prize allocated to an underlying game. The one or more user devices may be a handheld device including a display. An underlying game may be a sporting event, a match, a competition, or a video game.

A bingo wagering game method associated with a sporting event may be summarized as including receiving wager input from one or more players of the wagering game, wherein the wager input includes an indication of a number of one or more unit wagers and an assignment of a bingo card, wherein the bingo card includes a grid containing a plurality of cells with each cell being associated with at least one possible occurrence of an in-game event in the sporting event; receiving event occurrence data from an in-game event server that receives data regarding actual occurrences of in-game events during the sporting event; recording cell locations on the bingo cards of each player if the cells associated with possible occurrences match actual occurrences identified by the event occurrence data; comparing the recorded cell locations to a preset winning pattern of cells to determine if a preset winning pattern is achieved; and facilitating delivery of an award to a player having a bingo card which achieved the preset winning pattern.

In some embodiments of the bingo wagering game system associated with a sporting event, the in-game bingo system is in communication with a casino gaming system. In other embodiments of the bingo wagering game system associated with a sporting event, the in-game bingo system is in communication with a non-casino sporting environment, a non-casino sporting social website, or both.

A bingo wagering game system associated with a sporting event, the bingo wagering game system presenting gaming functions via a video touch screen display of a gaming device, may be summarized as including a plurality of input devices including: (a) an acceptance interface that facilitates acceptance of monetary funds; and (b) a payout interface actuatable to cause an initiation of a payout associated with a winning account balance; at least one gaming device memory device storing a gaming program; and a game processor that executes the gaming program, and causes the game processor to: receive wager input from one or more players of the wagering game, wherein the wager input includes an indication of a number of one or more unit wagers and an assignment of a bingo card, wherein the bingo card includes a grid containing a plurality of cells with each cell being associated with at least one possible occurrence of an in-game event in the sporting event; receive event occurrence data from an in-game event server that receives data regarding actual occurrences of in-game events during the sporting event; record cell locations on the bingo cards of each player if the cells associated with possible occurrences match actual occurrences identified by the event occurrence data; compare the recorded cell locations to a preset winning pattern of cells to determine if a preset winning pattern is achieved; and facilitate delivery of an award to a player having a bingo card which achieved the preset winning pattern.

BRIEF DESCRIPTION OF THE SEVERAL VIEWS OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may, thus, recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosure details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

In some embodiments of the bingo game system and method, one or more games may have results that are fully random, partially random, partially skill-based, or entirely skill-based, or combinations thereof. The one or more games that may be played may include, but are not limited to a maze game, a sports game, a catching game, an avoiding game, a balancing game, a first-person shooting game, a side view projectile game, a top view projectile game, a quartering view projectile game, a role playing game (RPG), a racing game, a fighting game, a massively multiplayer online role-playing game (MMORPG), a matching game, a hidden object game, a path game, a time-management game, a resource management game, a virtual fishing game, or any other suitable game or any combination thereof, for example.

Figure 1:
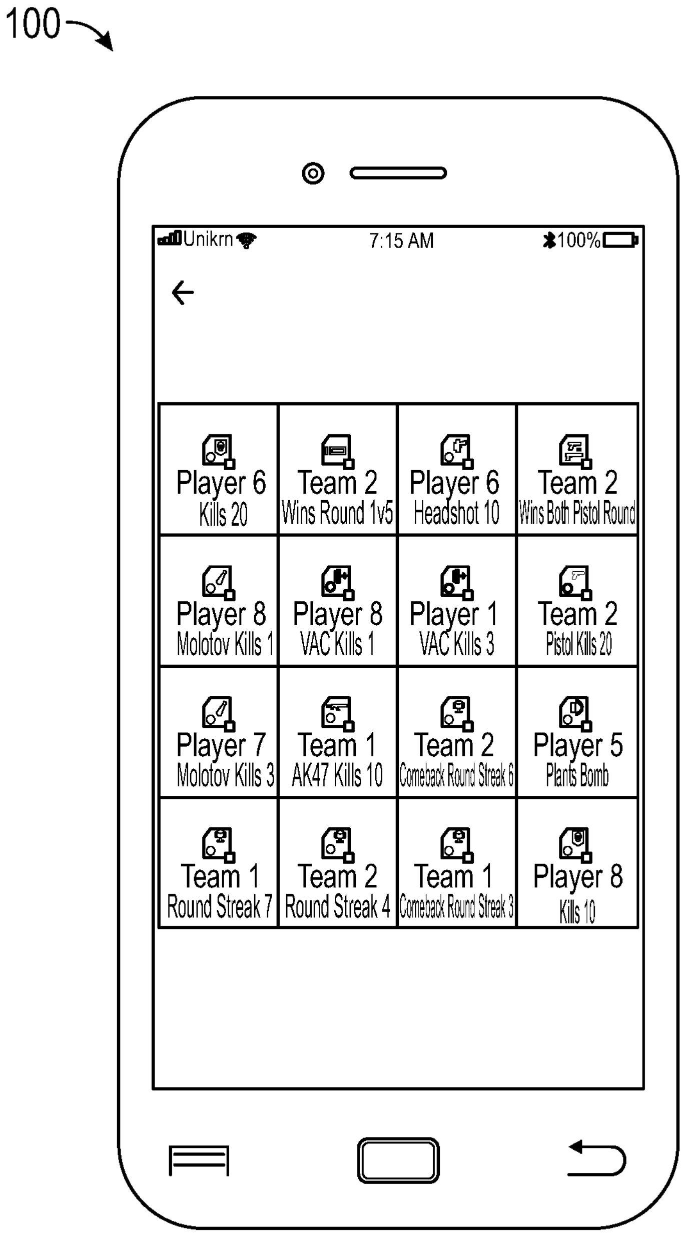
FIG. 1 illustrates an exemplary gaming display of the bingo game system and method in accordance with at least one embodiment.

FIG. 1 illustrates an exemplary game display or physical card 100 viewed by users of the system. The card of the bingo game system and method may be a card displayed on a gaming device, such as a mobile smartphone device, which may be a graphical user interface of a video game.

Figure 2A:
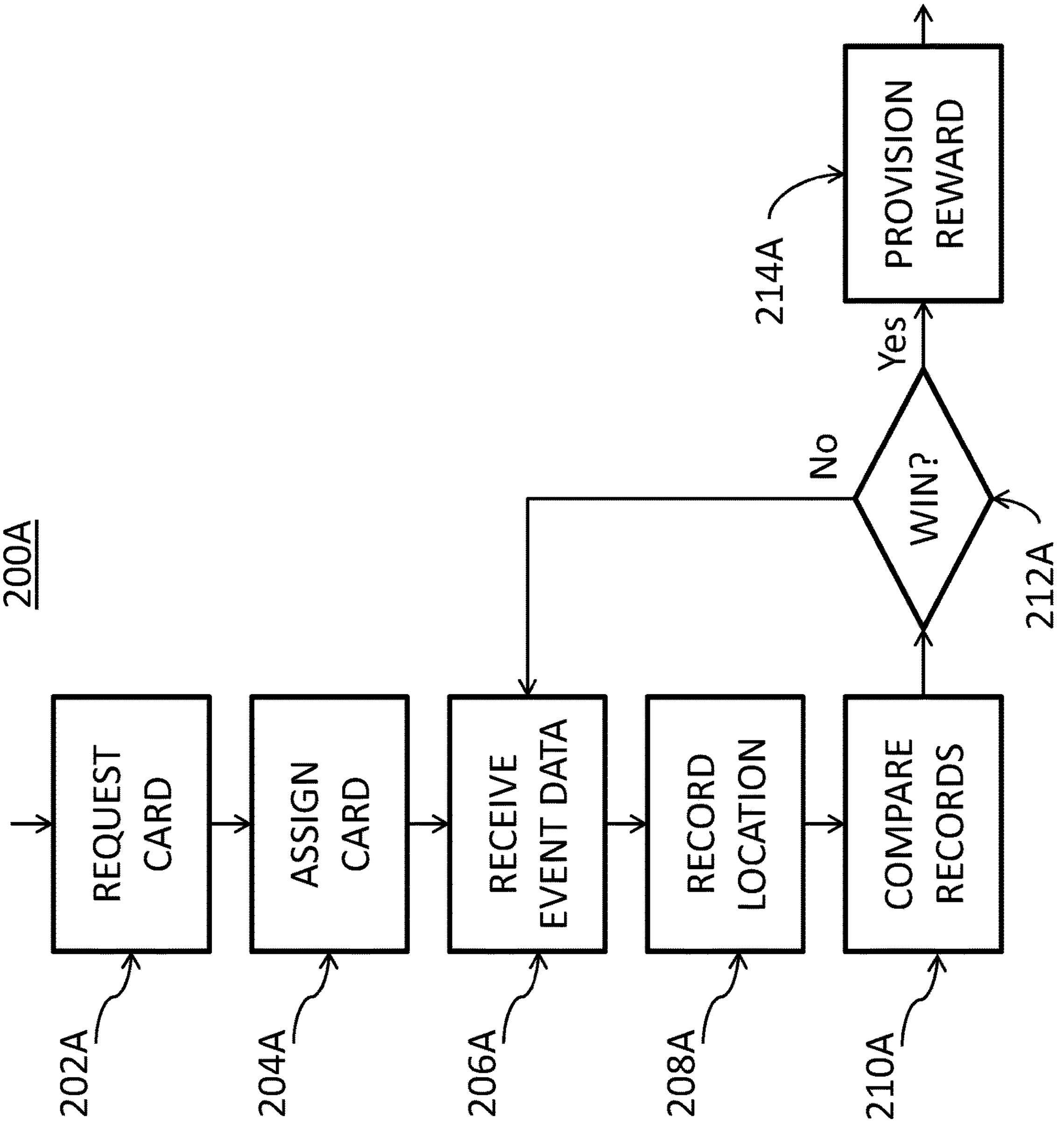
FIGS. 2A and 2B illustrate exemplary workflow diagrams 200A and 200B of the bingo game system and method in accordance with one or more embodiments.

FIG. 2A illustrates an exemplary workflow diagram 200A of the bingo game system and method. An exemplary embodiment of the bingo game system and method is directed to a bingo-like mobile app video game method associated with an underlying game or event, such as a video game or a sporting event. In one of more embodiments of the bingo game system and method, the bingo game is associated with intra-game data from one or more sporting events that includes one or more of basketball (e.g., National Basketball Association and the like), football (e.g., National Football Association, XFL, as well as other global football organizations including Rugby Union/AFL, and the like), golf (e.g., Professional Golfers' Association, Premier Golf League, Confederation of Professional Golf, and the like), soccer (e.g., Premier League, Major League Soccer, Liga MX, La Liga, Champions League, Europa League, Serie A, and the like), hockey (e.g., National Hockey League, and the like), Mixed Martial Arts/Ultimate Fighting Championship, and tennis (e.g., national and international tennis leagues, and the like).

Notably, in some embodiments of the bingo game system and method, the bingo game is not just associated a final outcome of a sporting event, but is associated with intra-game data from one or more sporting events. Such intra-game data from the sporting event may include one or more of: first team lineup change, second team lineup change, a result of an interaction between two opposing players, any scoring attempt, any successful scoring event, any unsuccessful scoring event, a specific scoring attempt by any player, a specific successful scoring event by any player, a specific unsuccessful scoring event by any player, a specific scoring attempt by a specific player, a specific successful scoring event by a specific player, a specific unsuccessful scoring event by a specific player, any defensive attempt, any successful defensive event, any unsuccessful defensive event, a specific defensive attempt by any player, a specific successful defensive event by any player, a specific unsuccessful defensive event by any player, a specific defensive attempt by a specific player, a specific successful defensive event by a specific player, a specific unsuccessful defensive event by a specific player, any penalty, a specific penalty by any player, a specific penalty by a specific player, a non-scoring attempted play, a successful non-scoring play, an unsuccessful non-scoring play, a specific non-scoring attempted play, a specific successful non-scoring play by any player of a first team, a specific unsuccessful non-scoring play by any player of a first team, a specific non-scoring play by a specific player, a specific successful non-scoring play by a specific player, and a specific unsuccessful non-scoring play by a specific player.

Such intra-game data from a particular sporting event, such as basketball, may include one or more of: two point jump shot success with or without respect to a particular player, two point jump shot miss with or without respect to a particular player, three point jump shot attempt with or without respect to a particular player, three point jump shot success with or without respect to a particular player, three point jump shot miss with or without respect to a particular player, two point dunk attempt with or without respect to a particular player, two point dunk success with or without respect to a particular player, two point dunk miss with or without respect to a particular player, assist with or without respect to a particular player, assist with or without respect to a particular player in combination with any other event in this list, turnover with or without respect to a particular player, turnover with or without respect to a particular player due to lost ball, turnover with or without respect to a particular player due to bad pass, turnover with or without respect to a particular player due to travelling, turnover with or without respect to a particular player due to double dribble, steal with or without respect to a particular player, three point jump shot attempt with or without respect to a particular player, three point jump shot success with or without respect to a particular player, three point jump shot miss with or without respect to a particular player, two point driving layup attempt, two point driving layup success, two point driving layup miss, defensive rebound with or without respect to a particular player, offensive rebound with or without respect to a particular player, out of bounds stoppage, delay of game violation, two point putback layup attempt with or without respect to a particular player, two point putback layup success with or without respect to a particular player, two point putback layup miss with or without respect to a particular player, goaltending violation with or without respect to a particular player, two point alley-oop dunk attempt with or without respect to a particular player, two point alley-oop dunk success with or without respect to a particular player, two point alley-oop dunk miss with or without respect to a particular player, timeout by a first team, timeout by a second team, two point driving dunk attempt with or without respect to a particular player, two point driving dunk success with or without respect to a particular player, two point driving dunk miss with or without respect to a particular player, drawing a non-shooting foul with or without respect to a particular player, drawing a shooting foul with or without respect to a particular player, making a shooting foul with or without respect to a particular player, missing a shooting foul with or without respect to a particular player, making two free throws with or without respect to a particular player, missing regular free throw 1 of 2 with or without respect to a particular player, missing regular free throw 2 of 2 with or without respect to a particular player, two point finger roll layup attempt with or without respect to a particular player, two point finger roll layup success with or without respect to a particular player, two point finger roll layup miss with or without respect to a particular player, drawings a personal foul with or without respect to a particular player, attempt a regular free throw 1 of 1 with or without respect to a particular player, make a regular free throw 1 of 1 with or without respect to a particular player, miss a regular free throw 1 of 1 with or without respect to a particular player, stoppage for an equipment malfunction with or without respect to a particular player, instant replay upholding call; and instant replay overturning call.

Moreover, users of the bingo game system and method are not merely wagering on intra-game events as one might at a sports book. Rather, users of the bingo game system and method are playing bingo games in which live (i.e., real time) or substantially live (i.e., real time) intra-game events from one or sporting events are being used to influence or alter the game play of the bingo game. For example, intra-game events from one or sporting events may be used to influence how cells are marked, how cards are played, if cards are played, what combinations are winning combinations, what payout values will be provided, and the like.

Participation to play may be free, for a fee, or a combination thereof, such as freemium. In an alternative embodiment, wagering and/or betting products may be integrated into the mobile application. Various embodiments of wagering bingo game systems and methods of the present disclosure may include (1) subscription (e.g., one card entry per week free—pay 'x' amount to receive more), (2) pay for additional cards (1 card on any event or a 'pack of 10), and (3) pay to move or substitute tiles to increase chances of winning. A mobile app requests a gaming card 202A for each player of the video game; Request input causes an assignment 204A of a bingo card, for example, whether randomly or by player interaction, wherein the bingo card may include a grid containing a plurality of cells with each cell being associated with a possible occurrence of an event in an underlying game, (see FIG. 1, for example). Event occurrence data 206A from an instance of the underlying game, wherein the event occurrence data includes an identification of an actual occurrence in the underlying game. In step 208A, the location on the bingo card of each player is marked/recorded, for example marking any cell on the bingo cards of each player if the cell is associated with a possible occurrence that matches the actual occurrence identified by the event occurrence data. In step 210A, compare all the recorded locations or marked cells to a preset winning pattern of cells to determine if the preset winning pattern is achieved. In the event of a winning card, the provision of an award in step 214A is facilitated to any player having a bingo card which achieved the preset winning pattern (step 212A), the award being a prize allocated to the underlying event. In the event that a player is not a winner (step 212A), the process resumes with step 206A to continue the event. Prizes may be allocated to certain events or games based on category or likeness. Further, advertisers may sponsor prizes that are offered and provisioned.

Figure 2B:
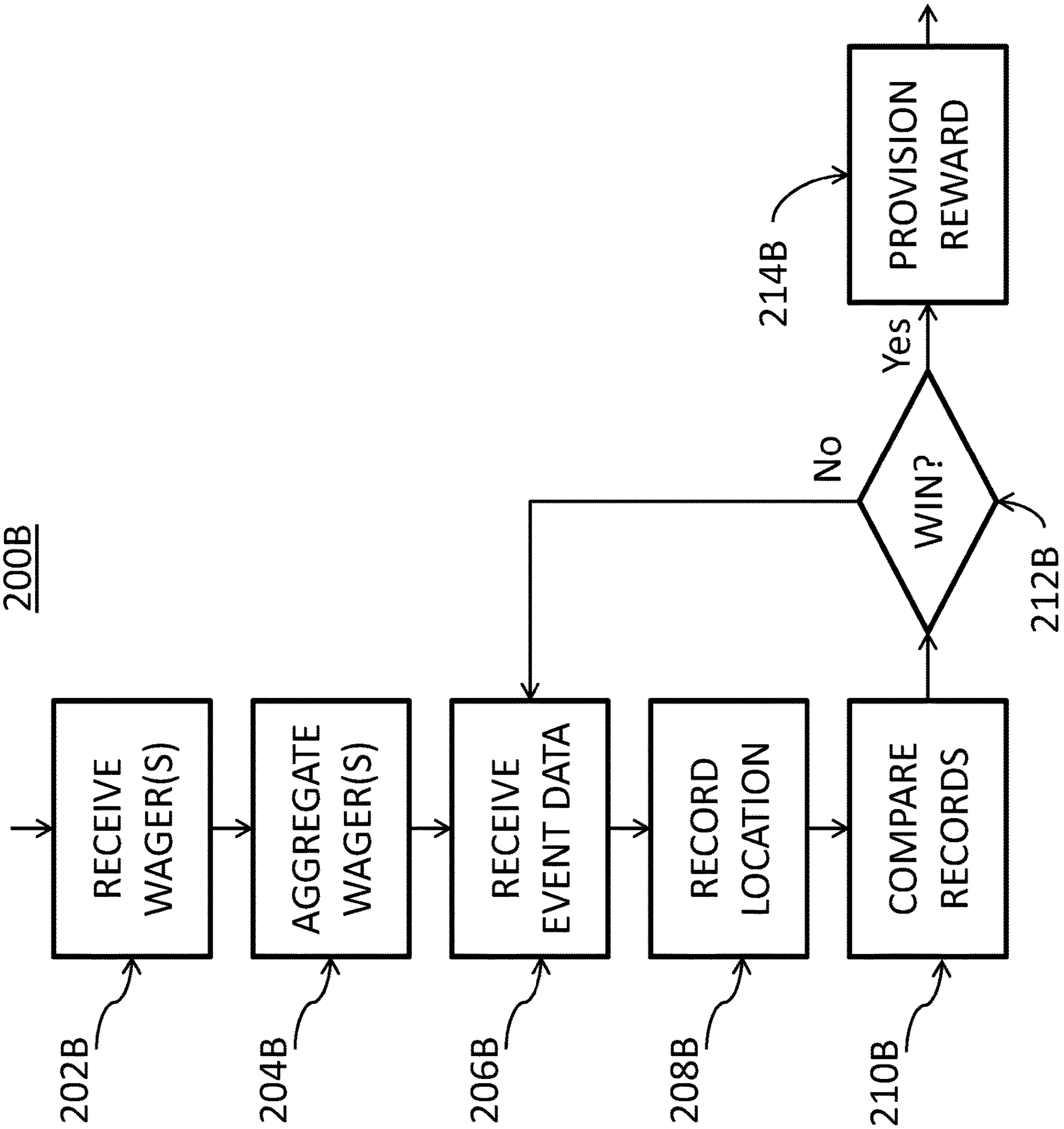

FIG. 2B illustrates another exemplary workflow diagram 200B of the bingo game system and method. An exemplary embodiment of the disclosure is directed to a bingo-like wagering game method associated with an underlying game comprising the steps of: a) receiving wager input 202B from each player of the wagering game, wherein the wager input includes an indication of a number of one or more unit wagers and an assignment of a bingo card, whether randomly or by player interaction, wherein the bingo card may include a grid containing a plurality of cells with each cell being associated with a possible occurrence of an event in the underlying game (see FIG. 1, for example); b) aggregating all wagers 204B to form a pool of wagers; c) receiving event occurrence data 206B from an instance of conducting the underlying game, wherein the event occurrence data includes an identification of an actual occurrence in the underlying game; d) recording the location 208B or otherwise marking any cell on the bingo cards of each player if the cell is associated with a possible occurrence that matches the actual occurrence identified by the event occurrence data; e) comparing all the recorded locations 210B or marked cells to a preset winning pattern of cells to determine if the preset winning pattern is achieved; and f) facilitating the provision of an award 214B to any player having a bingo card which achieved the preset winning pattern (step 212B), the award being a portion of the pool of wagers received. In the event that a player is not a winner (step 212B), the process resumes with step 206B to continue the event.

A wager input may be received by submitting information through a computerized player interface. The cells of each bingo card may be randomly associated with events from a database of events which may occur during the typical play of the underlying game, such as different actions during a sporting event (e.g., goals, touchdowns, points, etc.) or a video game (e.g., kills, headshots, round streaks, etc.). The events may have various associated probabilities of occurring and the bingo cards may be generated such that each card has a comparable amount of probabilities or overall chance of achieving a winning pattern. The cells may include symbols which are associated with the event, such as for example, a flag symbol for being associated with a player capturing a flag in the underlying game. The events may be of any value in the underlying game, that is, whether favorable or unfavorable in the underlying game, it makes no difference in the game of the bingo game system and method other than the fact the event occurred.

Figure 3:
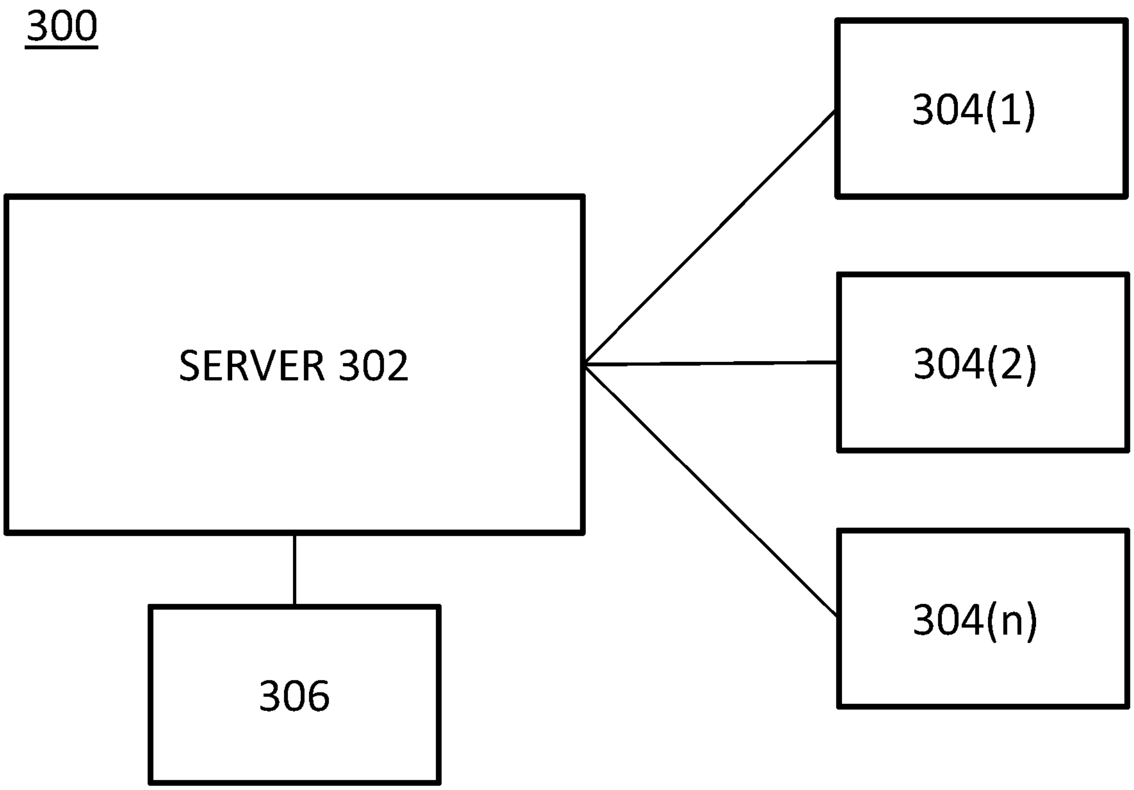
FIG. 3 illustrates an exemplary computing diagram 300 of the bingo game system and method in accordance with at least one embodiment.

FIG. 3 illustrates an exemplary computing diagram 300 in accordance with at least one embodiment of the bingo game system and method. Some embodiments of the bingo game system and method are directed to systems and methods including a plurality of player game devices (304(1), 304(2), . . . 304(*n*)) connected to a central gaming server 302. A game controller 306 may be implemented by the central gaming server or communicatively coupled to the central gaming server. Each player device may be connected to the server by any wired or wireless communication method. Each player game device enables a player to receive an electronic bingo card, as described above. The card may have, for example, 4×4 grid of cells, such as the exemplary game card shown in the attached FIG. 1. It is understood that the game card may be of a different size, such as 5×5. Each cell may be randomly generated or populated from a preset list of possible events that might occur during play of an instance of the underlying game. The attached FIG. 1 illustrates various events which may occur in the underlying game. Further, portions of the card or portions surrounding the card may be reserved for advertisements or messages to be conveyed to a user of the player device.

Each game may have at least one winning pattern. A winning pattern may be essentially a subset of the cells of the grid aligned in a row, column, or diagonal, for example, which trigger an award. In some embodiments, each game may have a game-ending scenario which signifies the end of the game. For example, the game-ending scenario may include when the underlying video game ends with no players having a winning pattern or prize(s) have been awarded to the players. The award associated with the game-ending scenario is awarded to the player(s) who achieve the game winning scenario. In yet another embodiment, prizes may be awarded to players for single tile completion. For example, in addition to, or instead of a winning pattern, such as a row of cells, a single cell/tile may trigger the awarding of a prize in response to recordation. The single cell/tile may be sponsored by an advertising partner, or the like, and the prize may be related to the advertising partner. For example, if the sponsor is Spalding®, the prize being awarded may be a Spalding® basketball. Even further, the single cell/tile being sponsored may be designed differently than other cells to include designs related to the advertising partner's brand, such as a company logo.

The gaming server 302 may either be the same server used with the underlying game or is connected with an underlying video game controller 306 for purposes of receiving in-game event occurrence data. Upon receipt of event occurrence data, the server 302 sends a signal to a mobile app of game devices 304(1)-304(*n*). The signal indicates to users of the mobile app to mark any cells on all cards shown on the player game devices 304(1)-304(*n*) if the cell is associated with an event occurrence and the event occurrence data indicates that the particular event actually occurred in the game. The server then compares the cards with the preset patterns/scenarios to determine if any of the winning pattern or game-ending scenarios have been achieved. The outcome of the electronic bingo game may be a loss for players if no winning pattern is achieved before the underlying game has ended. In some embodiments, if no such winning pattern is achieved, then new bingo cards may be issued to the game devices so that players will have an additional opportunity to achieve the winning pattern during the next instance of the underlying game.

Figure 4:
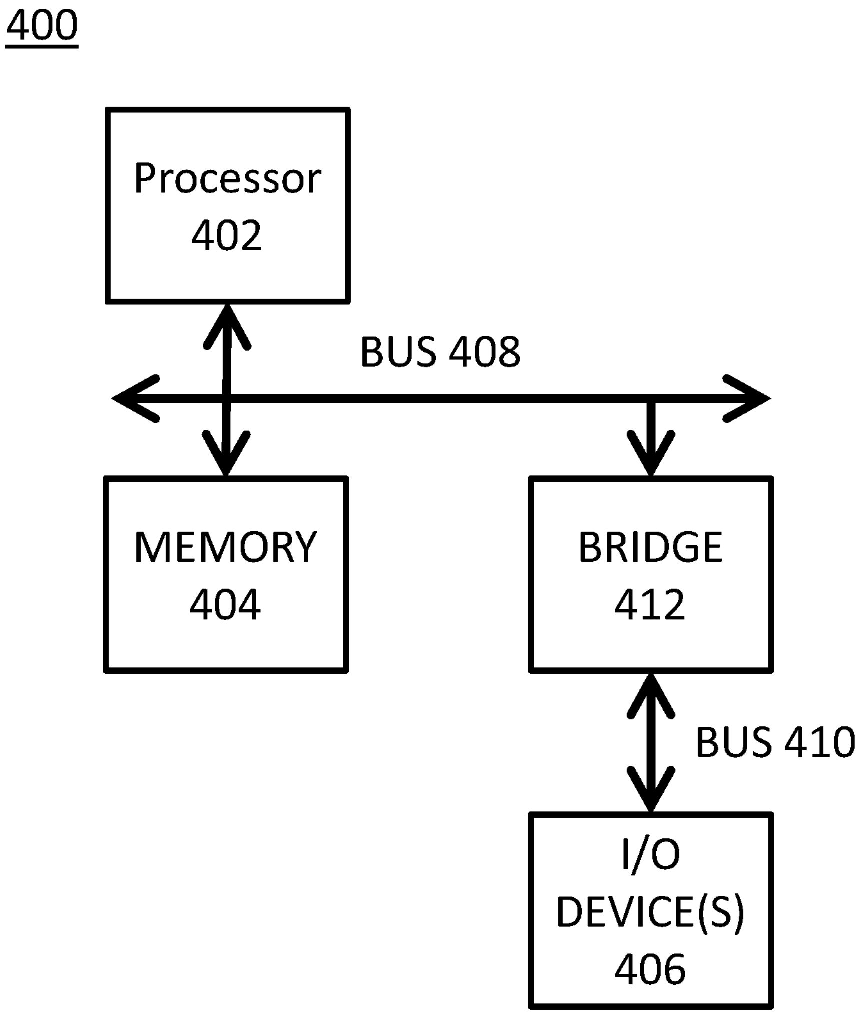
FIG. 4 is an example of a simplified functional block diagram of a computer system 700 of the bingo game system and method.

FIG. 4 is an example of a simplified functional block diagram of a computer system 400. The functional descriptions of the bingo game system and method can be implemented in hardware, software or some combination thereof.

As shown in FIG. 4, the computer system 400 includes a processor 402, a memory system 404 and one or more input/output (I/O) devices 406 in communication by a communication 'fabric'. The communication fabric can be implemented in a variety of ways and may include one or more computer buses 408, 410 and/or bridge and/or router devices 412 as shown in FIG. 4. The I/O devices 406 can include network adapters and/or mass storage devices from which the computer system 400 can send and receive data for generating and transmitting advertisements with endorsements and associated news. The computer system 400 may be in communication with the Internet via the I/O devices 408.

Figure 5B:
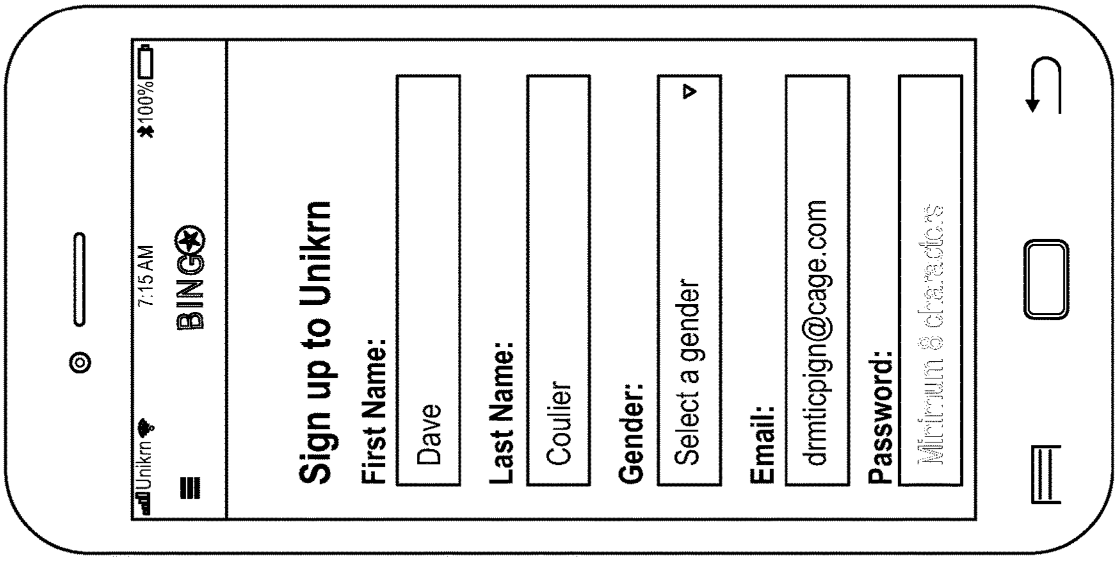
FIGS. 5A-5S illustrate various screenshots of various embodiments of the bingo game system and method.
Figure 5A:
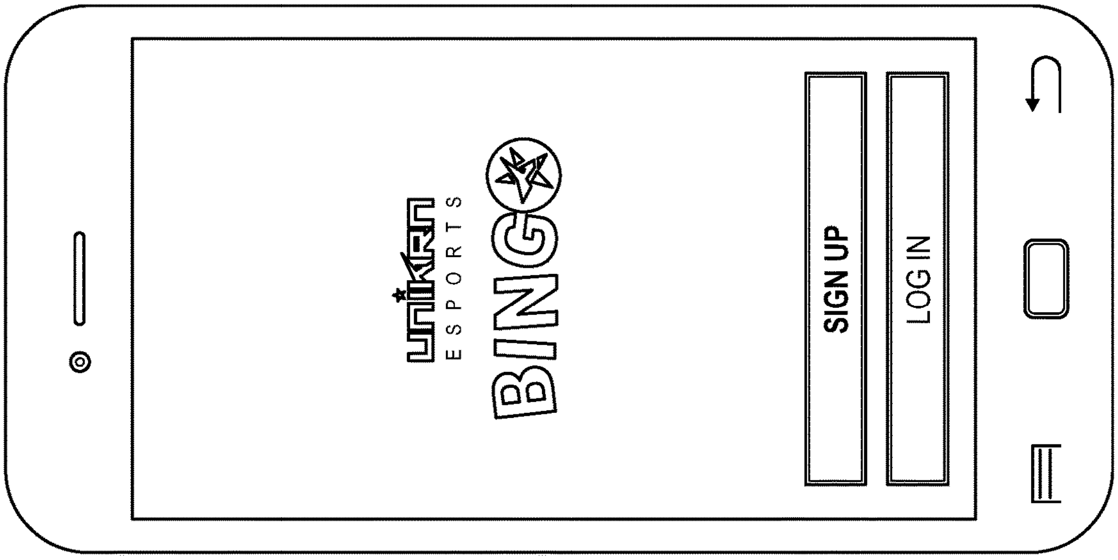
Figure 5C:
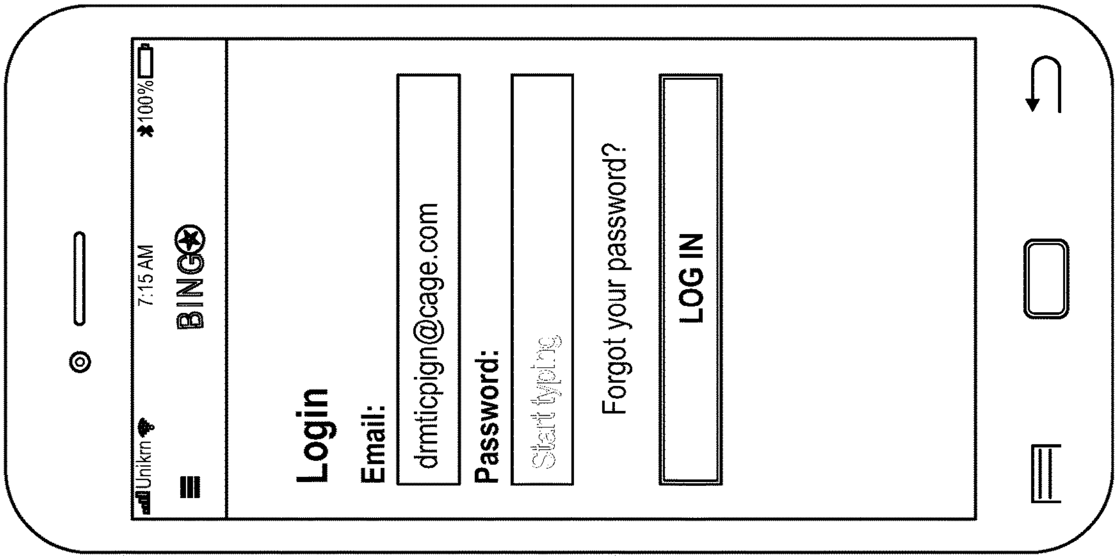
Figure 5D:
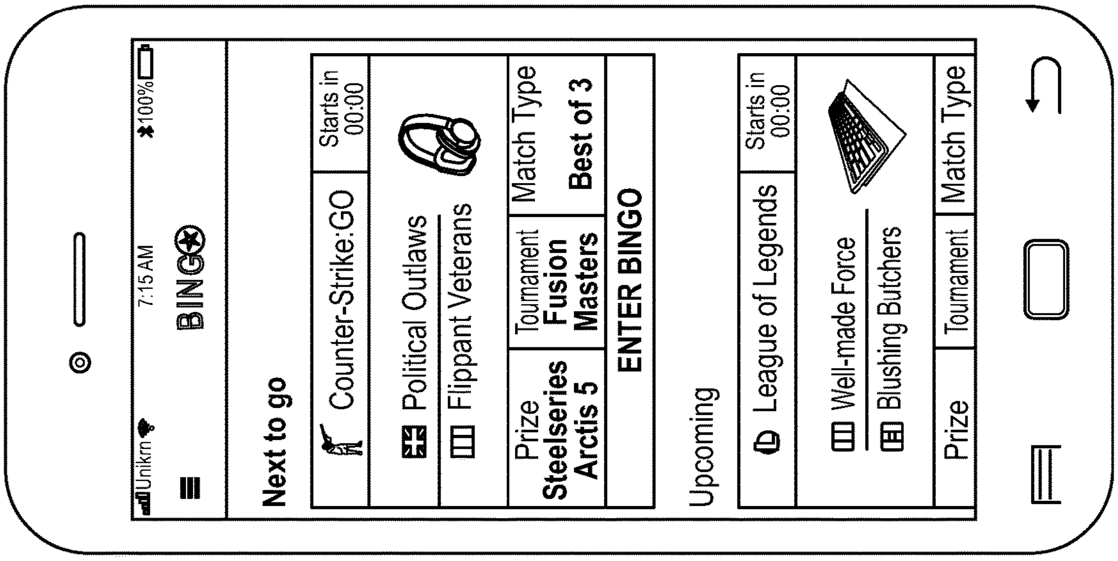
Figure 5E:
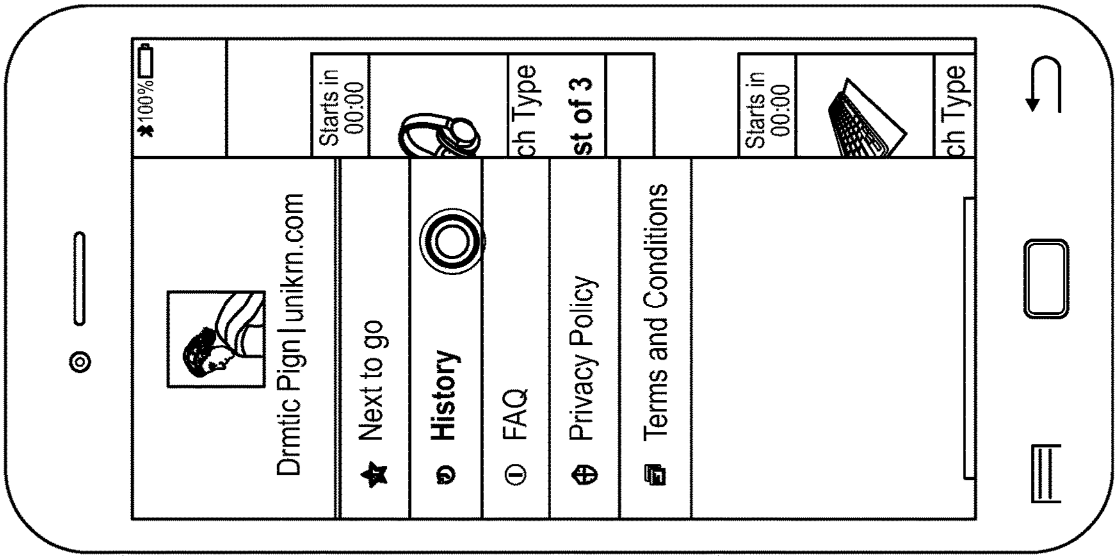
Figure 5F:
Figure 5G:
Figure 5H:
Figure 5I:
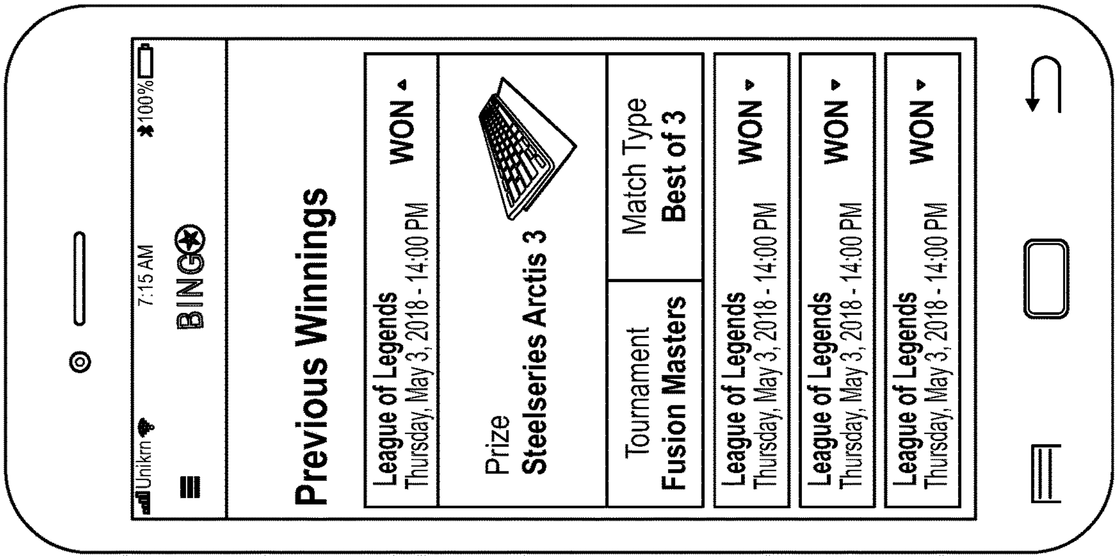
Figure 5J:
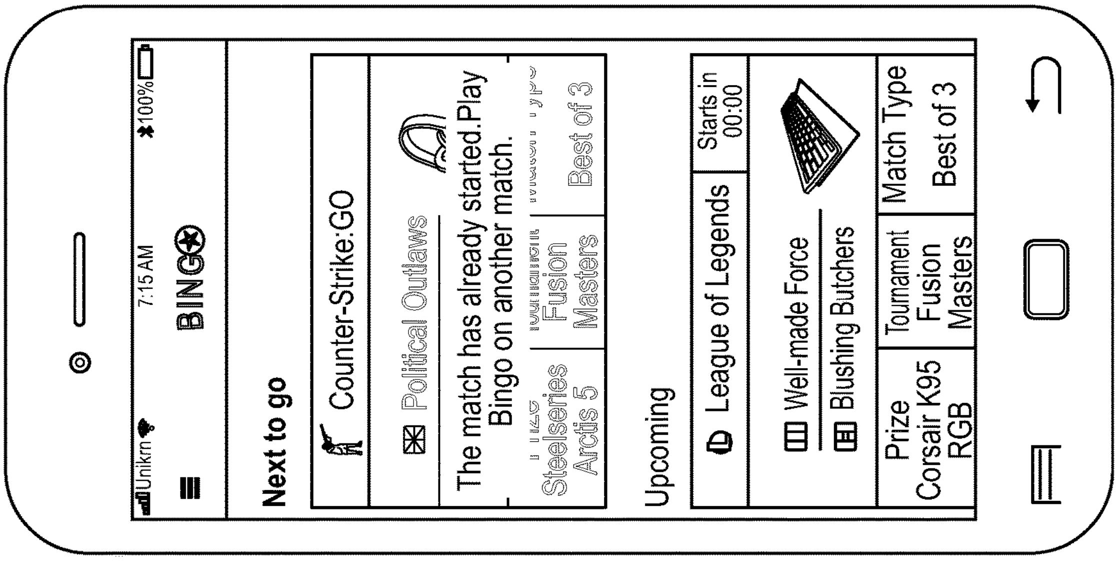
Figure 5L:
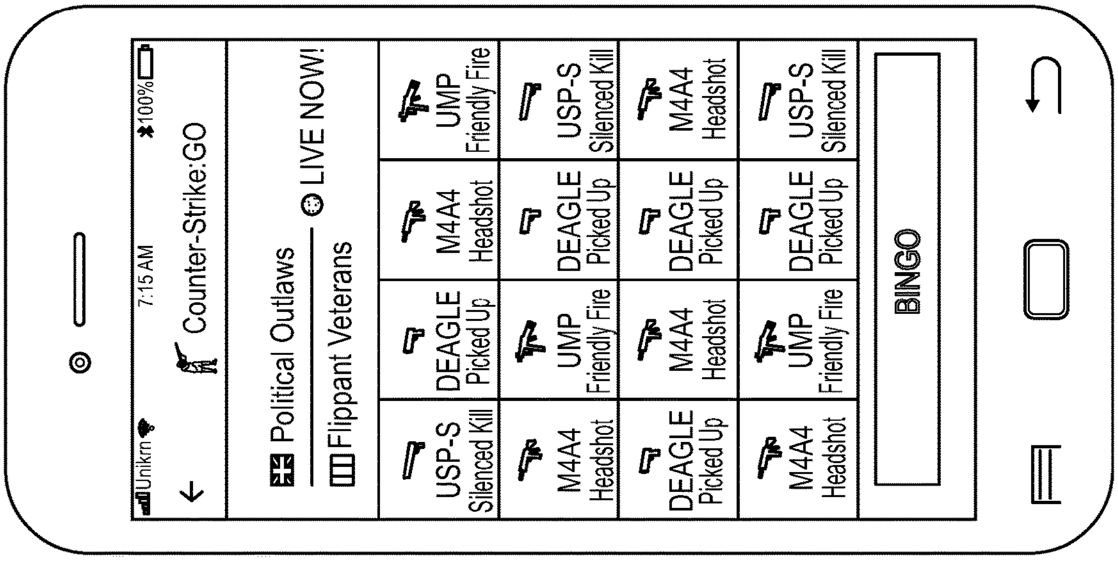
Figure 5K:
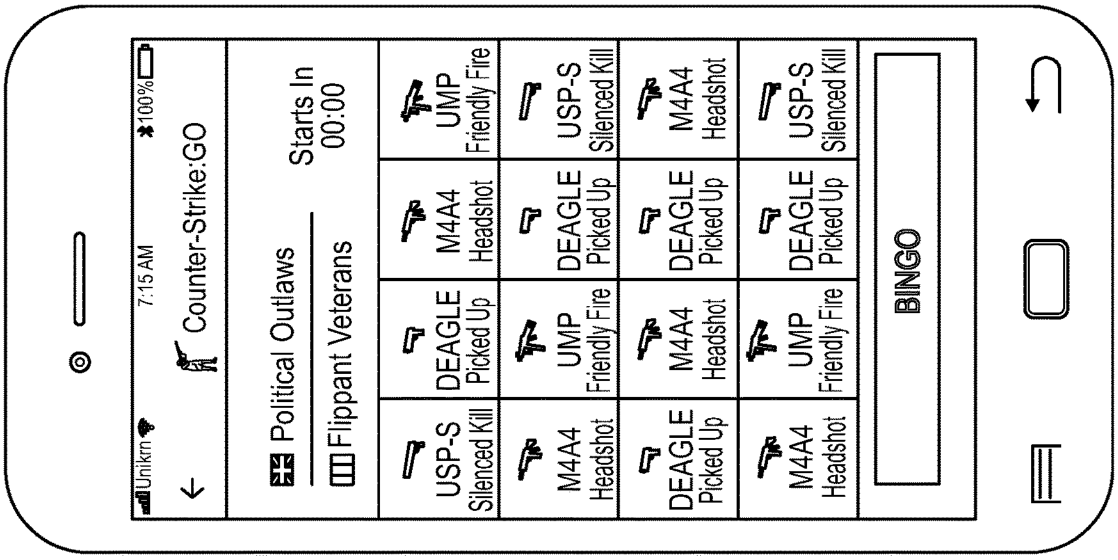
Figure 5N:
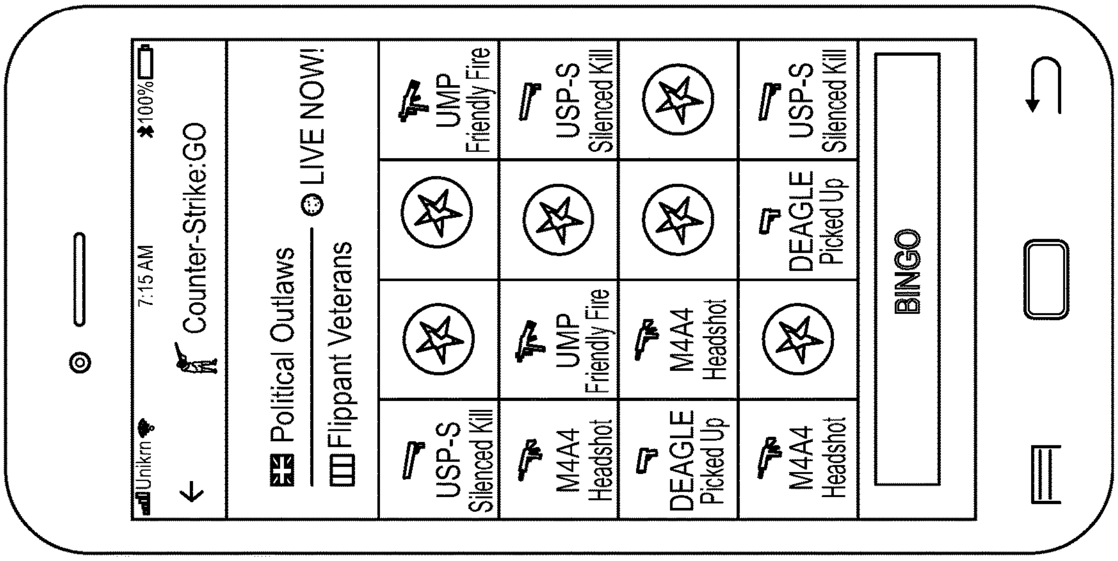
Figure 5M:
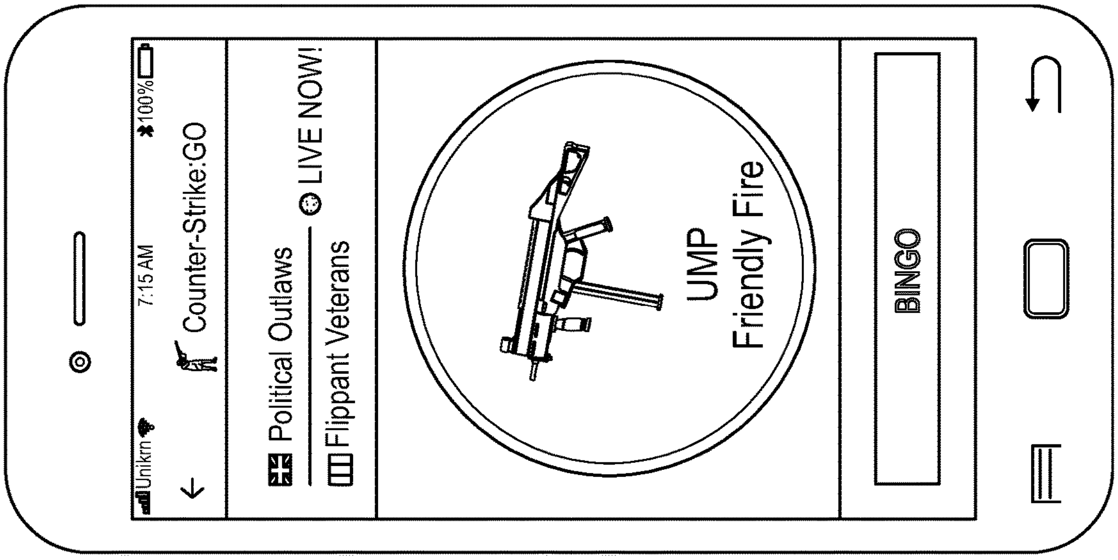
Figure 5O:
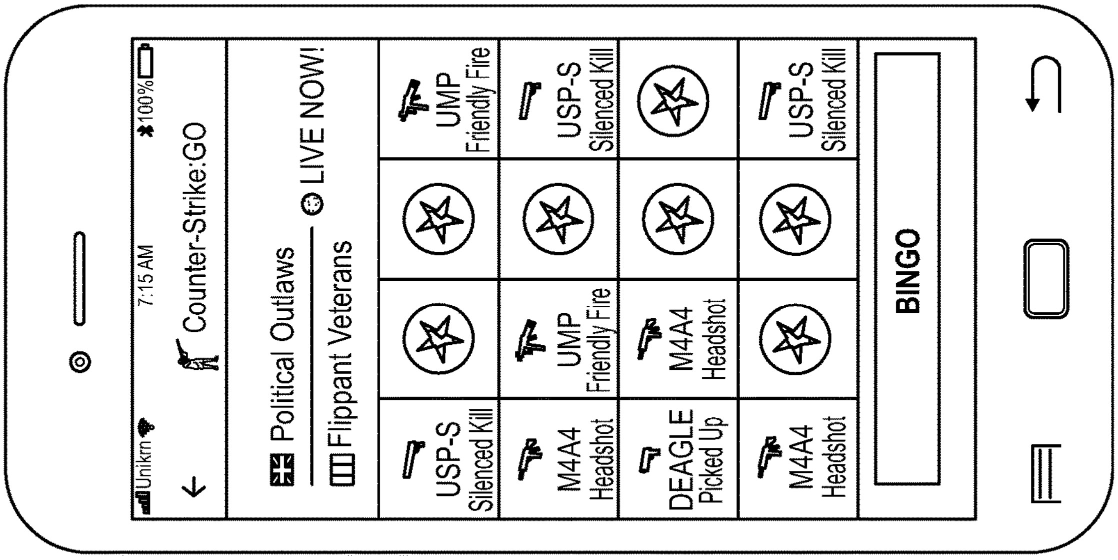
Figure 5P:
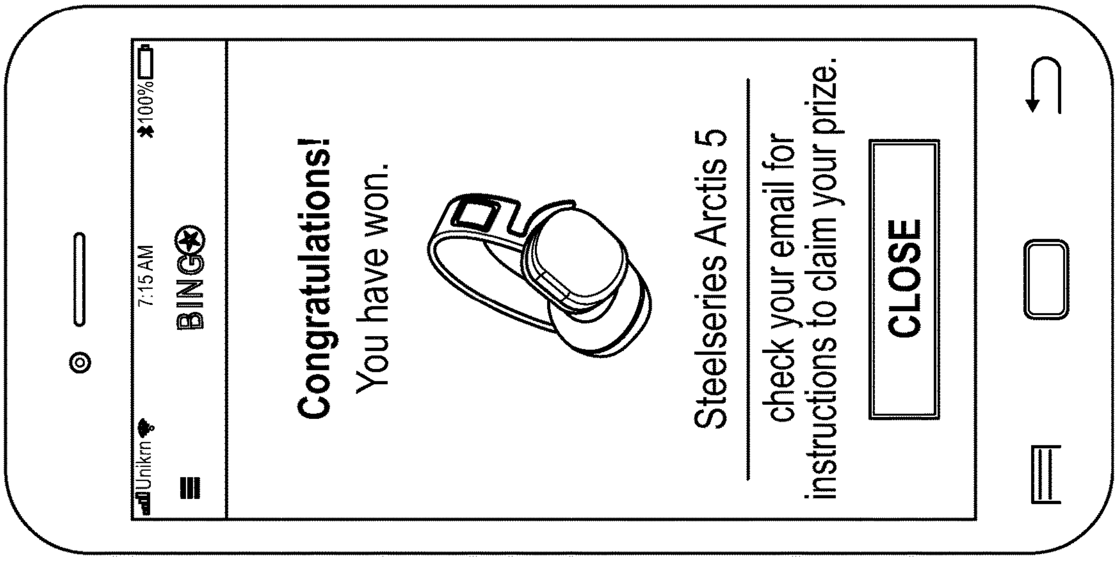
Figure 5R:
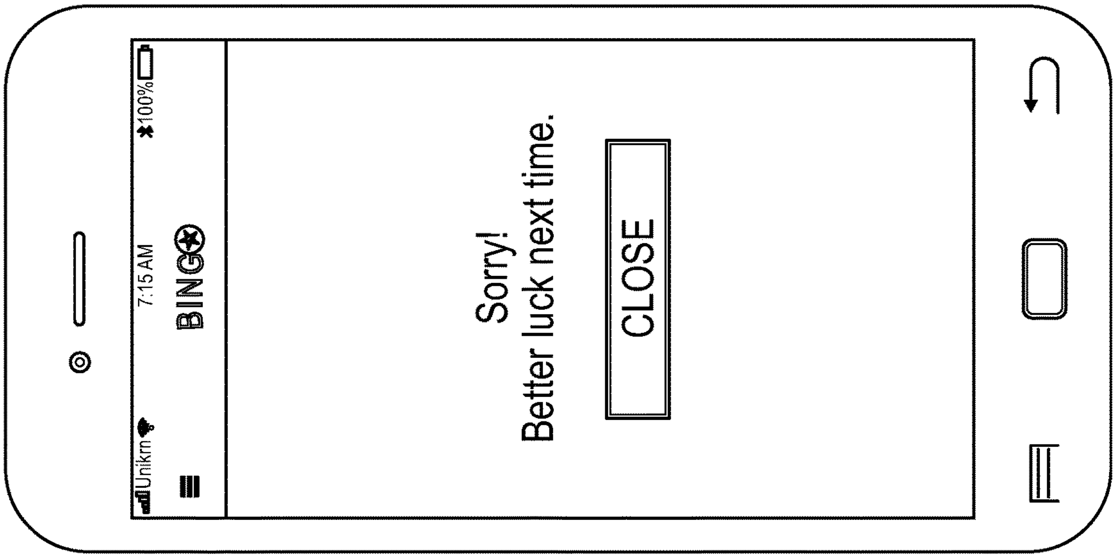
Figure 5Q:
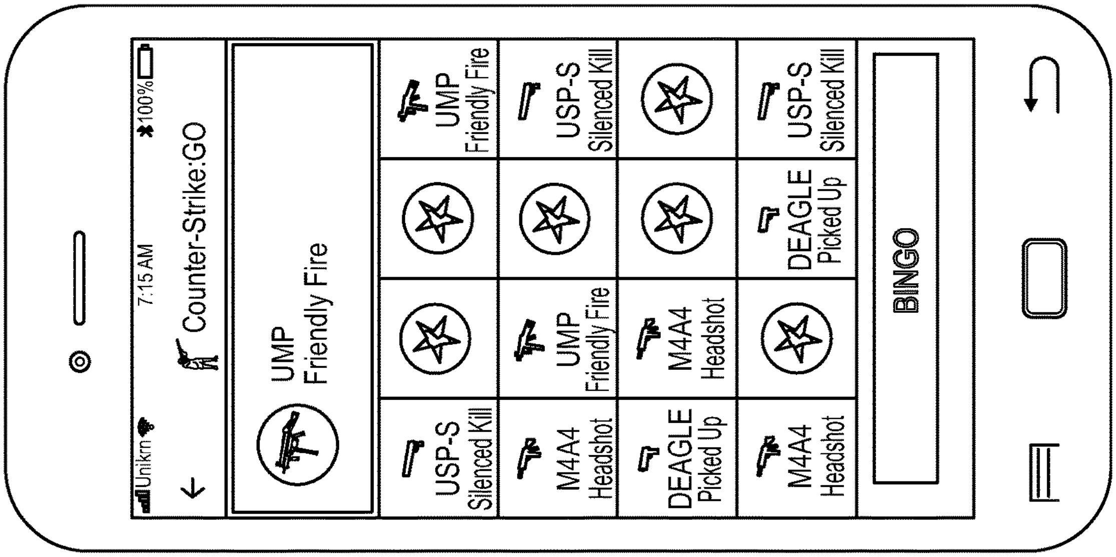
Figure 5S:
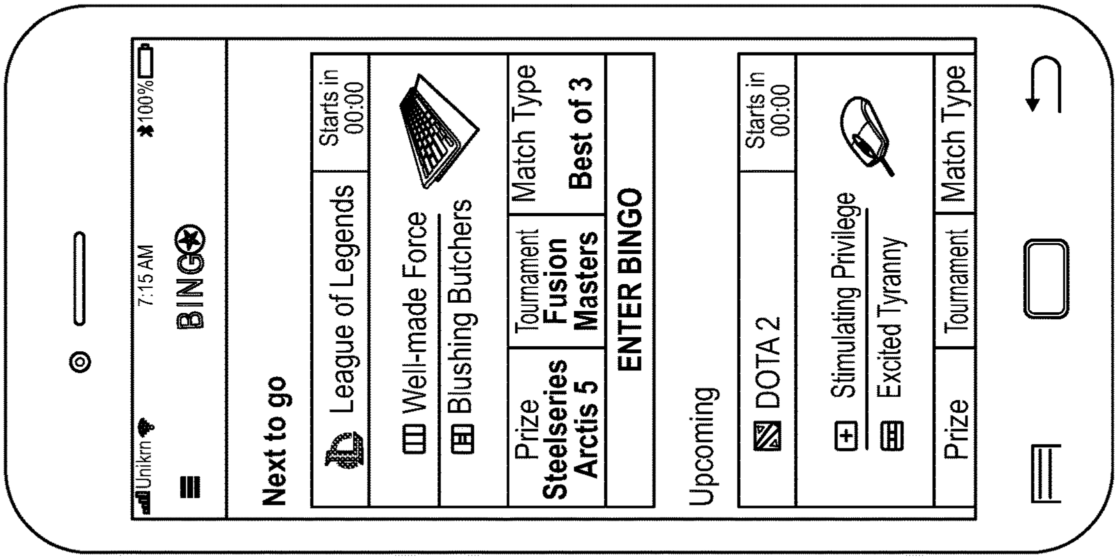

FIGS. 5A-5S provide exemplary screenshots applicable to one or more embodiments of the bingo game system and method. The screenshots are not meant to be limiting in any way, but merely provide a better understanding of the bingo game system and method.

FIG. 5A illustrates an exemplary welcome screen providing options to a user to either "SIGN UP" or "LOG IN." If the "SIGN UP" option is selected, the user may be shown the screen of FIG. 5B. The user may sign up for the service providing personal details, such as name, gender, email, or the like. If the "LOG IN" option had been selected, the user may be shown the screen shown in FIG. 5C. Login credentials may be provided, such as an e-mail and password combination. After the user has either joined or logged in successfully, the user may be shown home screen of FIG. 5D. The home screen may show current and upcoming BINGO games. Further, and as shown in FIG. 5D, details of an event may be shown. Event details may include, but is not limited to, game title, competitors, time to start, prize, tournament name, and match type. A user may join the BINGO game by selecting "ENTER BINGO." From the home screen, a user may select a menu to slide out (FIG. 5E) and have multiple options (e.g., Next to go, History (FIG. 5I), FAQ (FIG. 5F), Privacy Policy (FIG. 5G), and Terms and Conditions (FIG. 5H)). The history screen of FIG. 5I may include a history of all matches a user has entered and prizes won/lost. Other menu options of FIG. 5E may be included within the spirit and scope of the disclosure.

Based on a successful match selection in FIG. 5D, the user may be assigned a playing card, such as the playing card shown in FIG. 5K. A timer may be shown if the game has not yet commenced. Once the match has commenced, the screen may advance to FIG. 5L showing the user event data, a LIVE NOW! indicator, and a playing card grid as previously described. FIG. 5M illustrates an event occurrence that has occurred in the underlying game/match. The user may then be shown FIG. 5N and have the opportunity to interact and record the event occurrence. For example, a user may mark off a corresponding tile by clicking or tapping. In an alternate embodiment, marking of a tile may be performed automatically by tapping on the image shown in FIG. 5M. An exemplary winning game board is shown in FIG. 5O and the "BINGO" button may be activated. Once "BINGO" is achieved, the user may click on the activated button and be taken to FIG. 5P and collect their award. Further instructions may be included in FIG. 5P regarding prize details and how to claim. Moving back to FIG. 5N, if a user swipes right on match details, the user may be shown screen 5Q, which shows the last event that has occurred. The user has the opportunity to tap on the event image and the mobile app will check and mark the same image tile on the Bingo card. During gameplay, if one or more other user achieves "BINGO" and all prizes have been awarded, the user may be shown the screen of FIG. 5R informing the user that the game has ended. The user may then be shown the screen of FIG. 5S, sending the user back to the home screen where they may join another game. Further, portions of the screenshots of FIGS. 5A-5S may be reserved for advertisements or messages to be conveyed to a user of the player device.

Figure 6A:
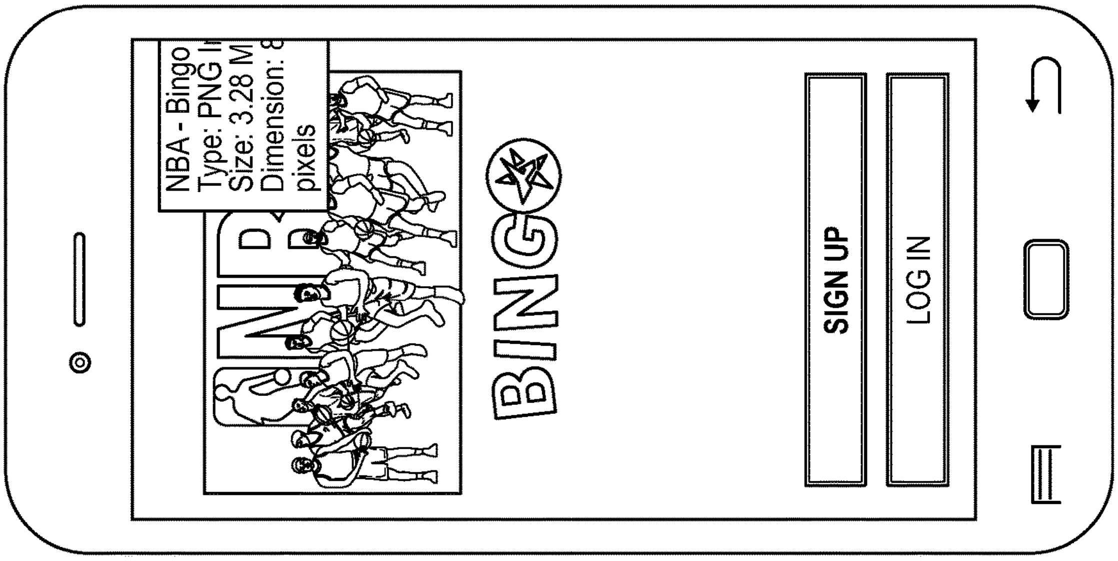
FIGS. 6A-6S illustrate various screenshots of various embodiments of the bingo game system and method.
Figure 6B:
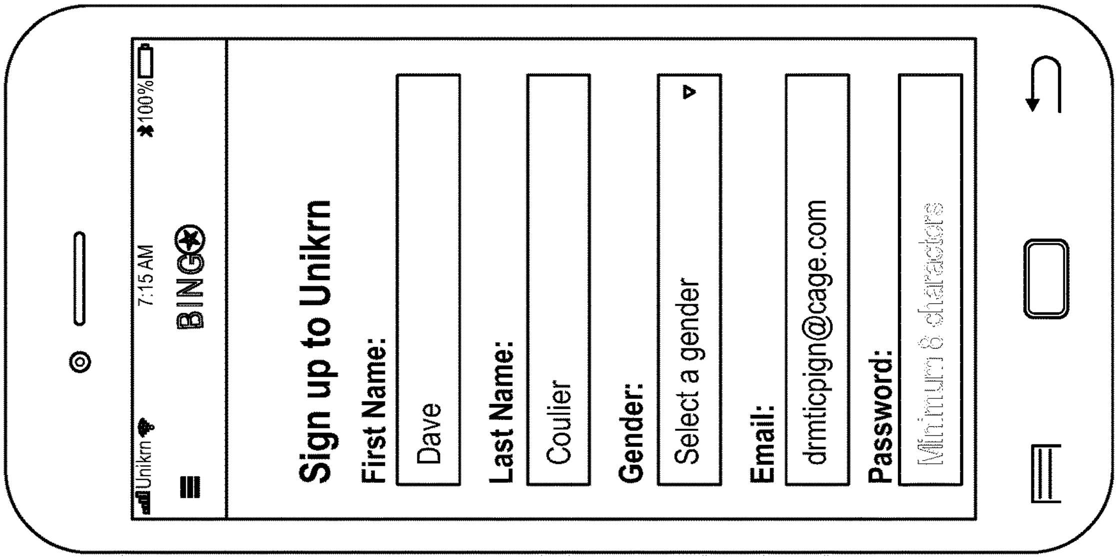
Figure 6C:
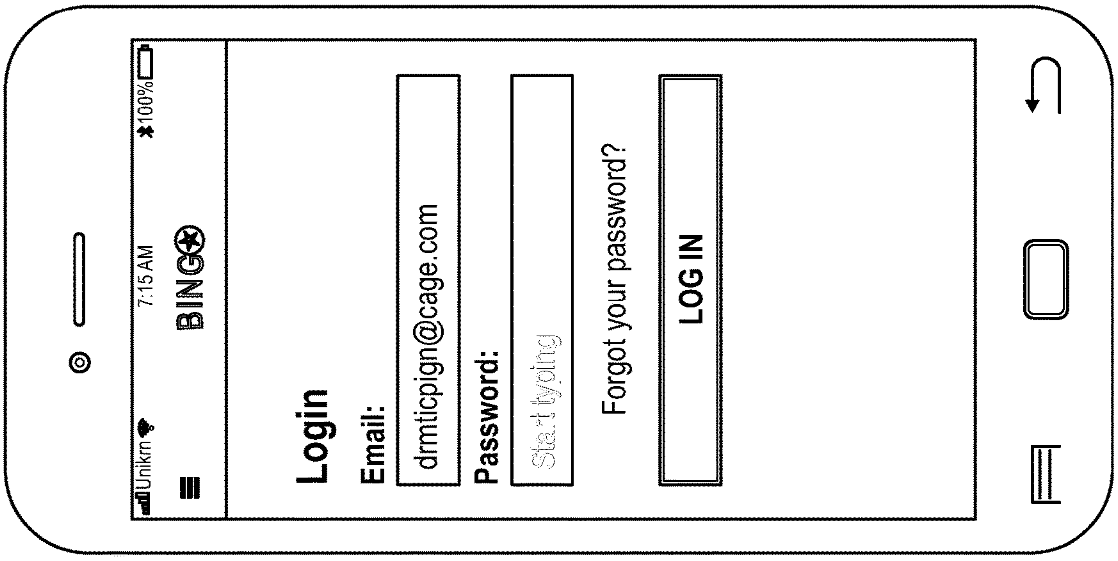
Figure 6E:
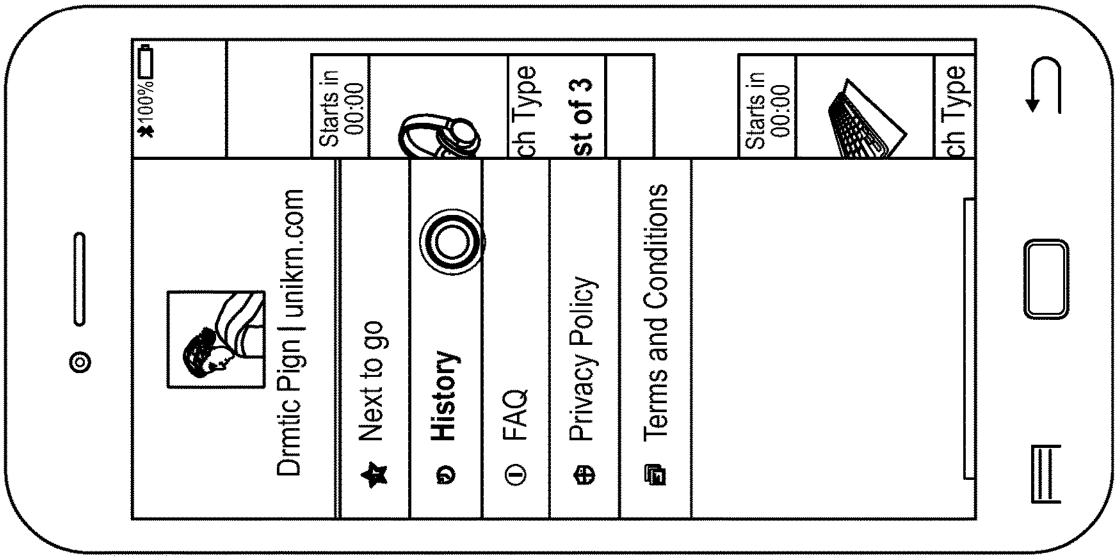
Figure 6D:
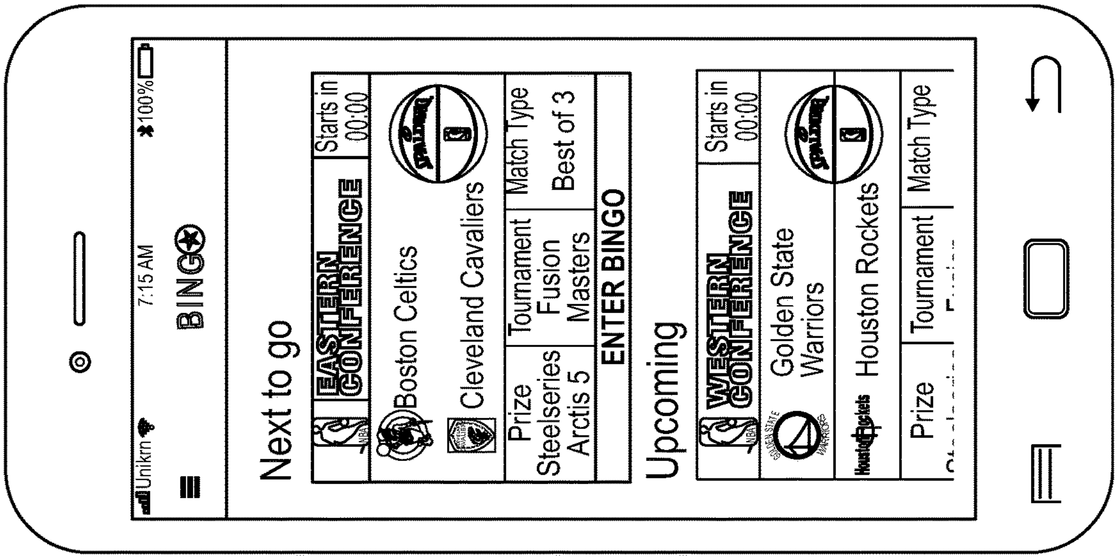
Figure 6F:
Figure 6G:
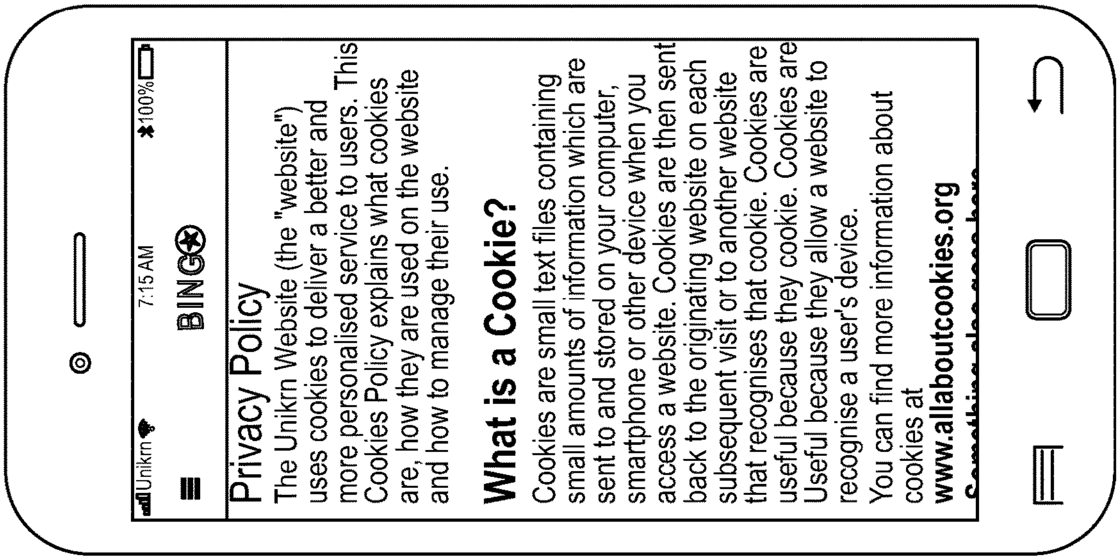
Figure 6H:
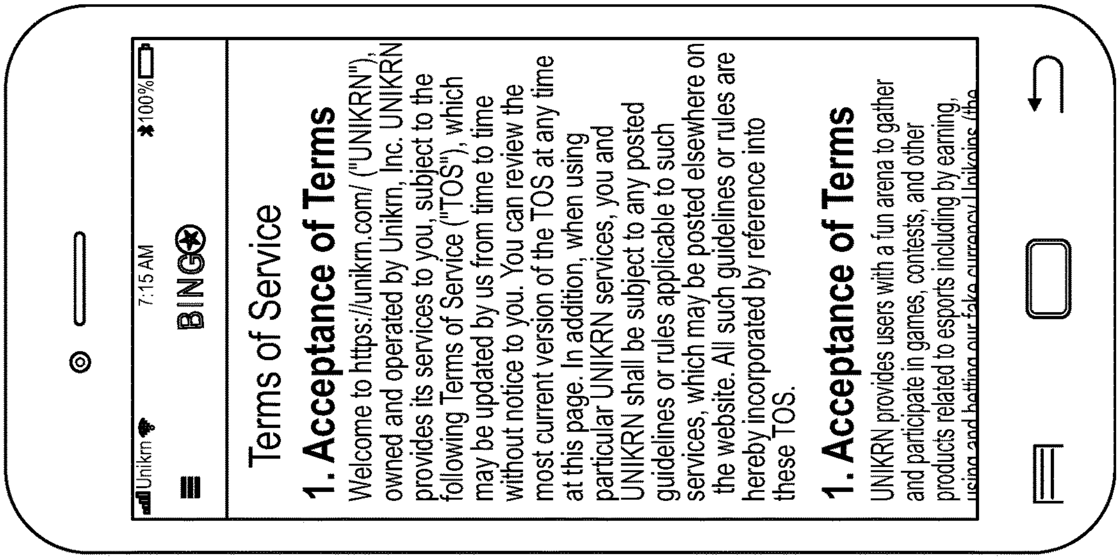
Figure 6I:
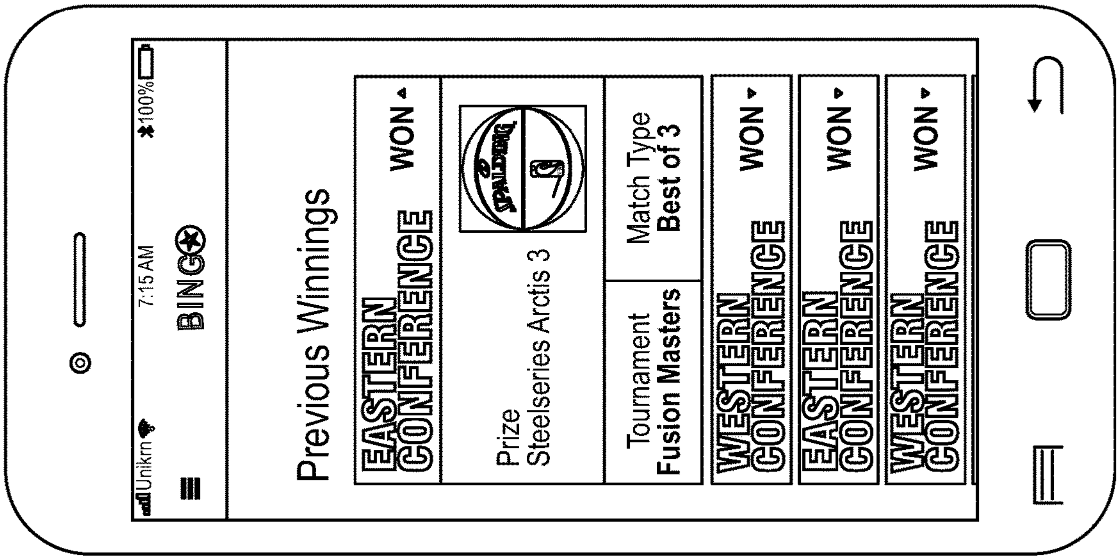
Figure 6K:
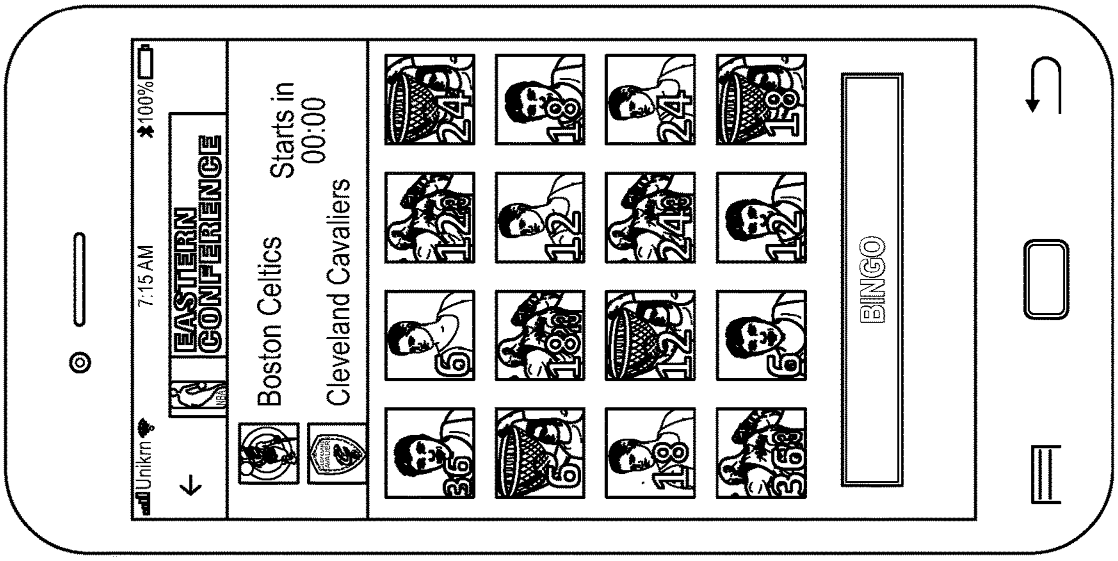
Figure 6J:
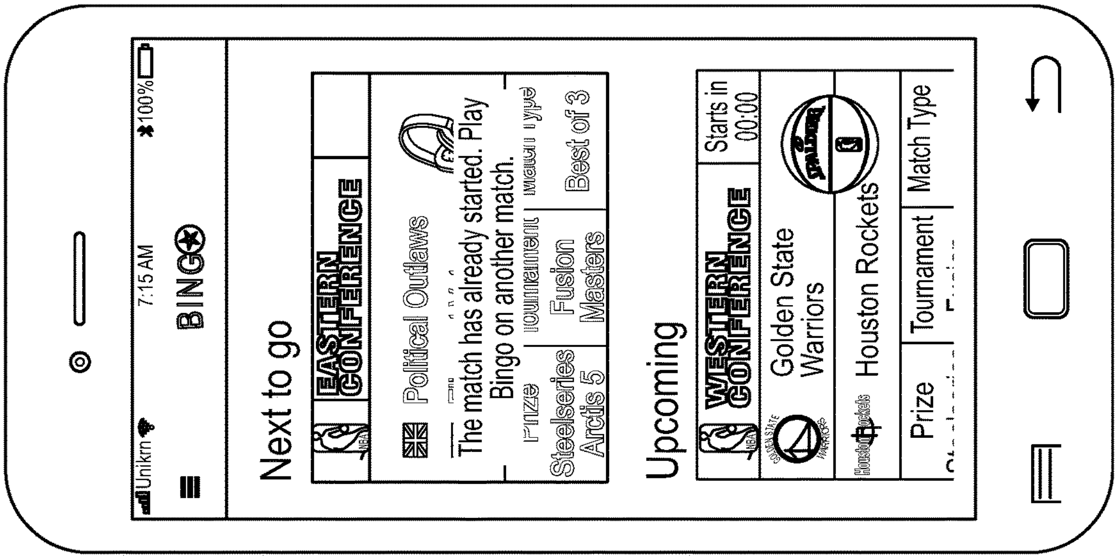
Figure 6M:
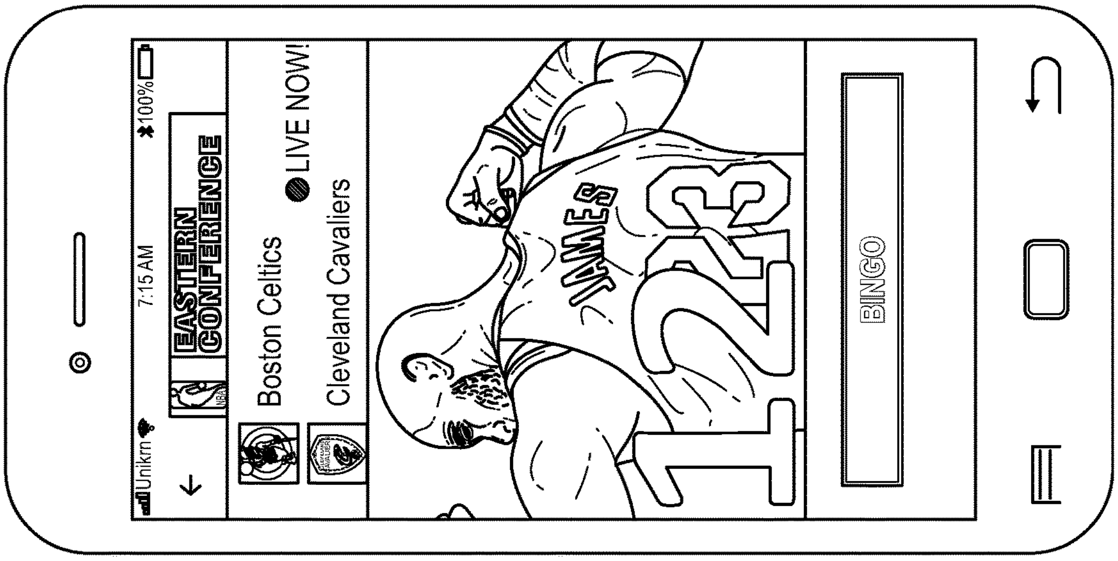
Figure 6L:
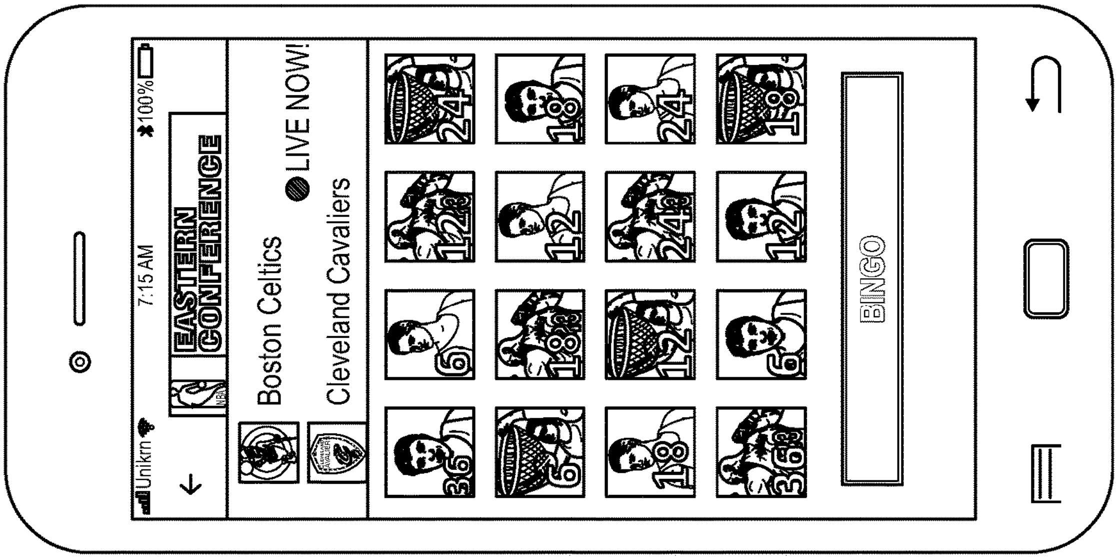
Figure 6O:
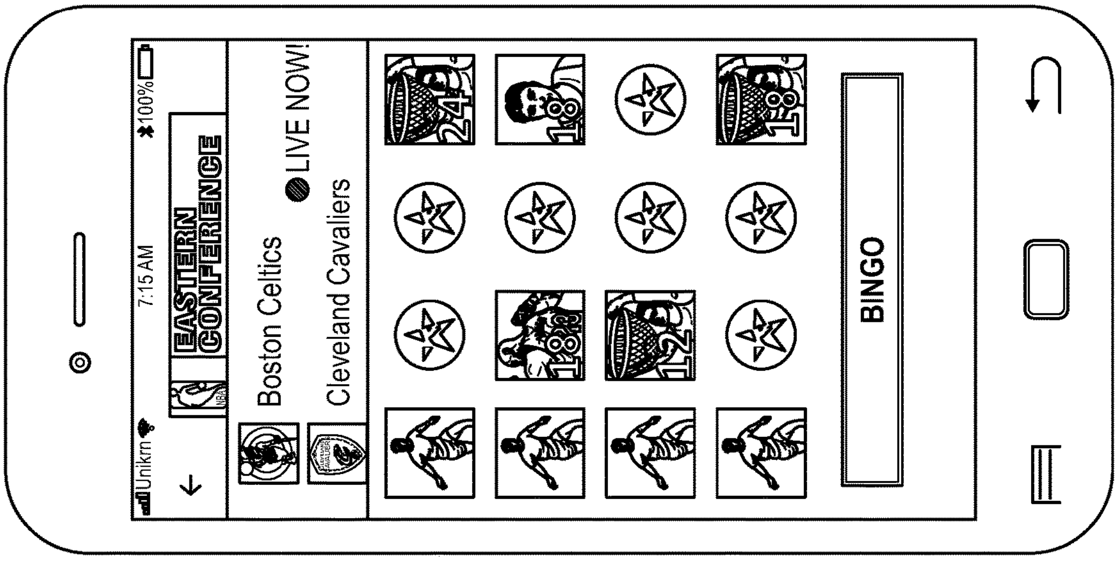
Figure 6N:
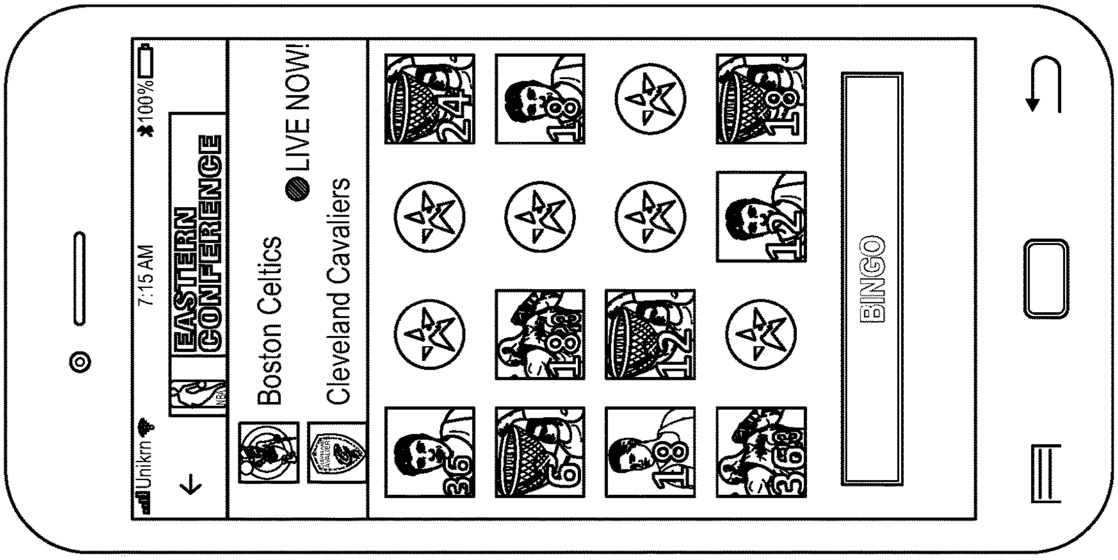
Figure 6P:
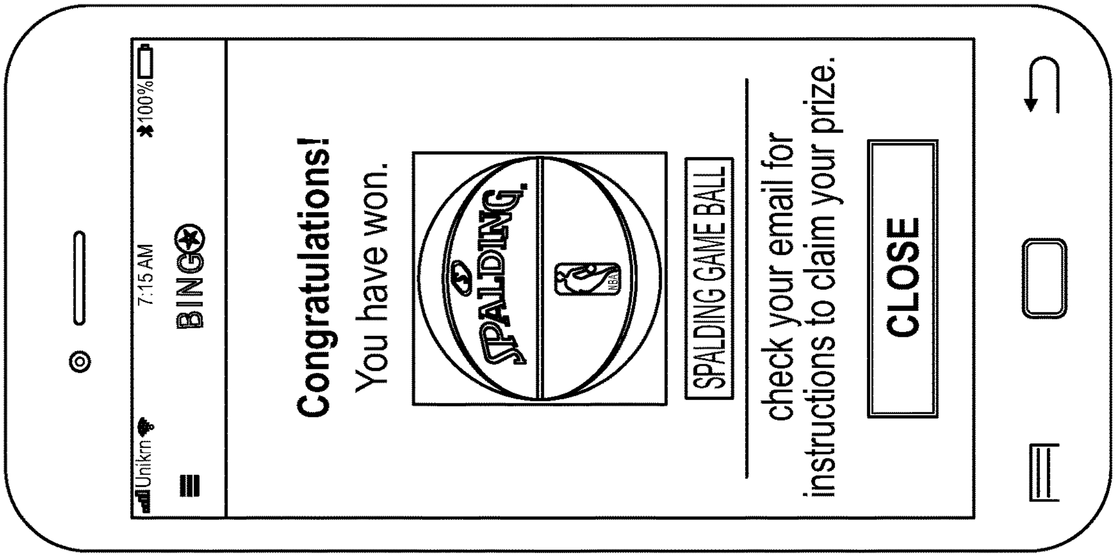
Figure 6Q:
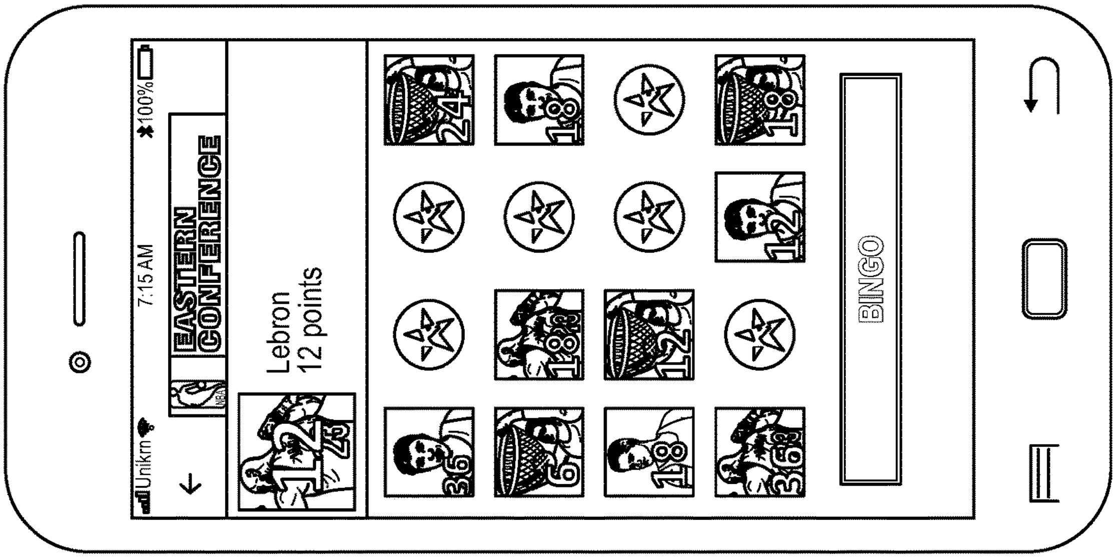
Figure 6R:
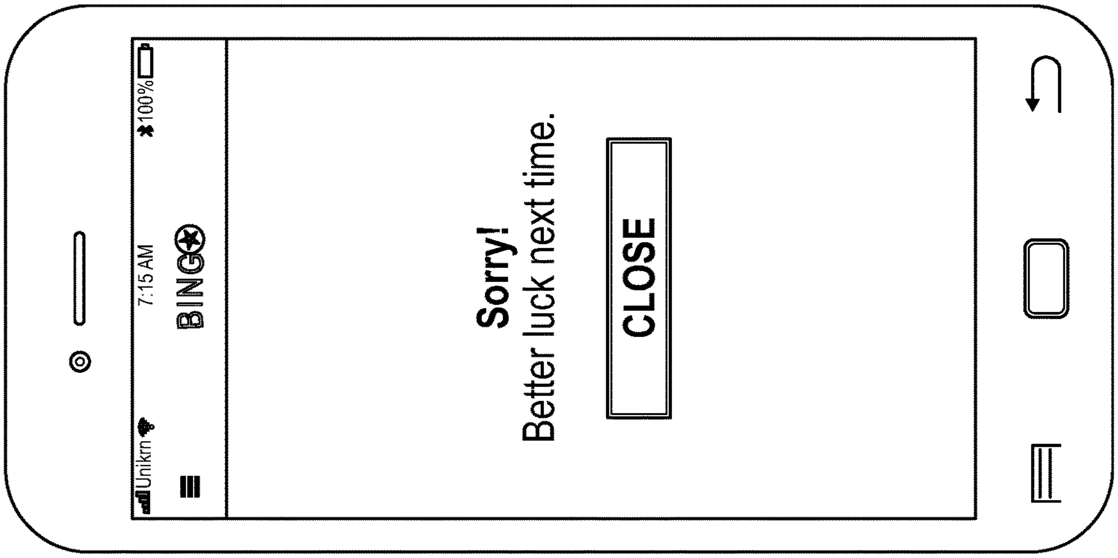
Figure 6S:
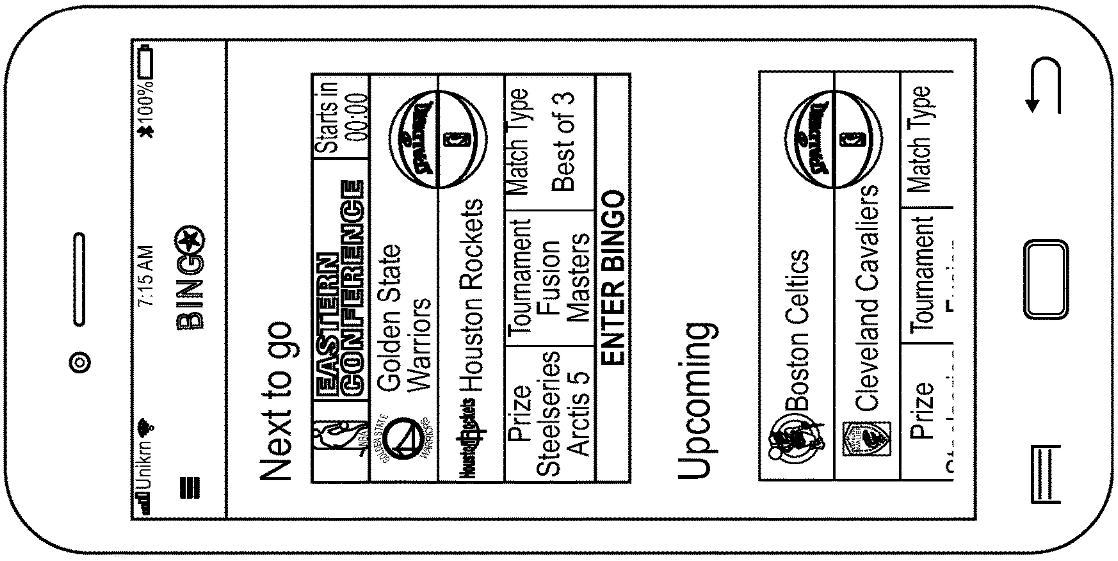

FIGS. 6A-6S provide exemplary screenshots applicable to one or more embodiments of the bingo game system and method. The screenshots are not meant to be limiting in any way, but merely provide a better understanding of the disclosure.

FIG. 6A illustrates an exemplary welcome screen providing options to a user to either "SIGN UP" or "LOG IN." If the "SIGN UP" option is selected, the user may be shown the screen of FIG. 6B. The user may sign up for the service providing personal details, such as name, gender, email, or the like. If the "LOG IN" option had been selected, the user may be shown the screen shown in FIG. 6C. Login credentials may be provided, such as an e-mail and password combination. After the user has either joined or logged in successfully, the user may be shown home screen of FIG. 6D. The home screen may show current and upcoming BINGO games. Further, and as shown in FIG. 6D, details of an event may be shown. Event details may include, but are not limited to, game title, competitors, time to start, prize, tournament name, and match type. A user may join the BINGO game by selecting "ENTER BINGO." From the home screen, a user may select a menu to slide out (FIG. 6E) and have multiple options (e.g., Next to go, History (FIG. 6I), FAQ (FIG. 6F), Privacy Policy (FIG. 6G), and Terms and Conditions (FIG. 6H)). The history screen of FIG. 6I may include a history of all matches a user has entered and prizes won/lost. Other menu options of FIG. 6E may be included within the spirit and scope of the disclosure.

Based on a successful match selection in FIG. 6D, the user may be assigned a playing card, such as the playing card shown in FIG. 6K. A timer may be shown if the game has not yet commenced. Once the match has commenced, the screen may advance to FIG. 6L showing the user event data, a LIVE NOW! indicator, and a playing card grid as previously described. FIG. 6M illustrates an event occurrence that has occurred in the underlying game/match. The user may then be shown FIG. 6N and have the opportunity to interact and record the event occurrence. For example, a user may mark off a corresponding tile by clicking or tapping. In an alternate embodiment, marking of a tile maybe performed automatically by tapping on the image in FIG. 6M. An exemplary winning game board is shown in FIG. 6O and the "BINGO" button may be activated. Once "BINGO" is achieved, the user may click on the activated button and be taken to FIG. 6P and collect their award. Further instructions may be included in FIG. 6P regarding prize details and how to claim. Moving back to FIG. 6N, if a user swipes right on match details, the user may be shown screen 6Q, which shows the last event that has occurred. User has the opportunity to tap on the event image and the mobile app will check and mark the same image tile on the Bingo card. During gameplay, if another user achieves "BINGO," and all prizes have been awarded, the user may be shown the screen of FIG. 6R informing the user that the game has ended. The user may then be shown the screen of FIG. 6S, sending the user back to the home screen where they may join another game. Further, portions of the screenshots of FIGS. 6A-6S may be reserved for advertisements or messages to be conveyed to a user of the player device.

In some embodiments of the bingo wagering game system associated with a sporting event, the in-game bingo system is in communication with a casino gaming system. In other embodiments of the bingo wagering game system associated with a sporting event, the in-game bingo system is in communication with a non-casino sporting environment, a non-casino sporting social website, or both.

Those of ordinary skill in the art will recognize that many modifications and variations of the present disclosure may be implemented without departing from the spirit or scope of the disclosure. Thus, it is intended that the present disclosure cover the modification and variations of this disclosure provided they come within the scope of the appended claims and their equivalents.

The various illustrative logics, logical blocks, modules, and engines, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

Some embodiments of the disclosure may be generally directed to systems and methods of administering a bingo-like game over a communication network, as described herein.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

It should be readily apparent that the systems and methods of the bingo game system and method may include various computer and network related software and hardware, such as programs, executable instructions, operating systems, memory storage devices, data input/output devices, data processors, servers with links to data communication systems, wireless or otherwise, and data transceiving terminals, and may be a standalone device or incorporated in another platform, such as a mobile device. The bingo game system and method may be provided on electronic platforms with multiple player positions. In addition, the bingo game system and method may be provided at least in part on a personal computing device, such as home computer, laptop or mobile computing device through an online communication connection or connection with the Internet. Those skilled in the art will further appreciate that the precise types of software and hardware used are not vital to the full implementation of the bingo game system and method so long as players and operators thereof are provided with useful access thereto or the opportunity to play the game as described herein.

It should be understood that the aforementioned embodiments of the bingo game system and method may be incorporated in a fully or partially automated or interactive, computerized platform supporting multiple player positions. It should be readily apparent that additional computerized or manual systems may also be employed in accordance with the disclosure in order to achieve its full implementation as a system, apparatus or method.

While exemplary systems and methods, and applications of methods of the disclosure, have been described herein, it should also be understood that the foregoing is only illustrative of a few particular embodiments with exemplary and/or preferred features, as well as principles of the disclosure, and that various modifications can be made by those skilled in the art without departing from the scope and spirit of the disclosure. Therefore, the described embodiments should not be considered as limiting of the scope of the disclosure in any way. Accordingly, the disclosure embraces alternatives, modifications and variations which fall within the spirit and scope of the disclosure as set forth herein.

The invention claimed is:

1. An in-game bingo system, comprising:

a network;

a central gaming server that receives data regarding actual occurrences of in-game events during a sporting event, the central gaming server including at least one gaming device memory device storing a gaming program and a game processor that executes the gaming program;

a game controller; and one or more user computing devices each corresponding to a player, wherein the central gaming server, the game controller, and the one or more user computing devices are communicatively coupled by the network, and wherein the central gaming server includes a memory having instructions stored thereon that when executed by the game processor, cause the game processor to:

assign a virtual bingo card to each of the one or more user computing devices, each virtual bingo card containing a plurality of cells, each cell being associated with at least one possible occurrence of an in-game event of a plurality of in-game events in the sporting event;

receive event occurrence data from an in-game event server that receives data regarding actual occurrences of the plurality of in-game events during the sporting event;

cause display, at the one or more user computing devices, of an image separate from the plurality of cells, wherein the image indicates an actual occurrence of an in-game event of the plurality of in-game events during the sporting event;

receive a selection of the displayed image;

process the event occurrence data regarding the actual occurrence of the in-game event of the plurality of in-game events during the sporting event to determine whether the actual occurrences matches one or more of the possible occurrences;

record cell locations on the virtual bingo cards of each player for determined cells associated with possible occurrences that match actual occurrences identified by the event occurrence data, wherein at least one cell location of the recorded cell locations is recorded automatically in response to the received selection of the displayed image;

modify a display of the matched cells on the computing device on the virtual bingo card to indicate the determined match between the in-game events and the possible occurrences of a respective cell;

compare the recorded cell locations to a preset winning pattern of cells to determine if the preset winning pattern is achieved using the actual occurrences from multiple in-game events of the plurality of in-game events; and award winners of the bingo game during the sporting event when the preset winning pattern is achieved using the actual occurrences in the event occurrence data from the multiple in-game events in the plurality of in-game events.

2. The in-game bingo system of claim 1, wherein the sporting event is selected from one or more of: basketball, football, XFL, Rugby, golf, soccer, hockey, Mixed Martial Arts/Ultimate Fighting Championship, and tennis.

3. The in-game bingo system of claim 1, further comprising event occurrence data from the sporting event that includes one or more of: first team lineup change, second team lineup change, a result of an interaction between two opposing players, any scoring attempt, any successful scoring event, any unsuccessful scoring event, a specific scoring attempt by any player, a specific successful scoring event by any player, a specific unsuccessful scoring event by any player, a specific scoring attempt by a specific player, a specific successful scoring event by a specific player, a specific unsuccessful scoring event by a specific player, any defensive attempt, any successful defensive event, any unsuccessful defensive event, a specific defensive attempt by any player, a specific successful defensive event by any player, a specific unsuccessful defensive event by any player, a specific defensive attempt by a specific player, a specific successful defensive event by a specific player, a specific unsuccessful defensive event by a specific player, any penalty, a specific penalty by any player, a specific penalty by a specific player, a non-scoring attempted play, a successful non-scoring play, an unsuccessful non-scoring play, a specific non-scoring attempted play, a specific successful non-scoring play by any player of a first team, a specific unsuccessful non-scoring play by any player of a first team, a specific non-scoring play by a specific player, a specific successful non-scoring play by a specific player, and a specific unsuccessful non-scoring play by a specific player.

4. The in-game bingo system of claim 1, further comprising event occurrence data from the sporting event that includes one or more of: two point jump shot attempt with or without respect to a particular player, two point jump shot success with or without respect to a particular player, two point jump shot miss with or without respect to a particular player, three point jump shot attempt with or without respect to a particular player, three point jump shot success with or without respect to a particular player, three point jump shot miss with or without respect to a particular player, two point dunk attempt with or without respect to a particular player, two point dunk success with or without respect to a particular player, two point dunk miss with or without respect to a particular player, assist with or without respect to a particular player, assist with or without respect to a particular player in combination with any other event in this list, turnover with or without respect to a particular player, turnover with or without respect to a particular player due to lost ball, turnover with or without respect to a particular player due to bad pass, turnover with or without respect to a particular player due to travelling, turnover with or without respect to a particular player due to double dribble, steal with or without respect to a particular player, three point jump shot attempt with or without respect to a particular player, three point jump shot success with or without respect to a particular player, three point jump shot miss with or without respect to a particular player, two point driving layup attempt, two point driving layup success, two point driving layup miss, defensive rebound with or without respect to a particular player, offensive rebound with or without respect to a particular player, out of bounds stoppage, delay of game violation, two point putback layup attempt with or without respect to a particular player, two point putback layup success with or without respect to a particular player, two point putback layup miss with or without respect to a particular player, goaltending violation with or without respect to a particular player, two point alley-oop dunk attempt with or without respect to a particular player, two point alley-oop dunk success with or without respect to a particular player, two point alley-oop dunk miss with or without respect to a particular player, timeout by a first team, timeout by a second team, two point driving dunk attempt with or without respect to a particular player, two point driving dunk success with or without respect to a particular player, two point driving dunk miss with or without respect to a particular player, drawing a non-shooting foul with or without respect to a particular player, drawing a shooting foul with or without respect to a particular player, making a shooting foul with or without respect to a particular player, missing a shooting foul with or without respect to a particular player, making two free throws with or without respect to a particular player, missing regular free throw 1 of 2 with or without respect to a particular player, missing regular free throw 2 of 2 with or without respect to a particular player, two point finger roll layup attempt with or without respect to a particular player, two point finger roll layup success with or without respect to a particular player, two point finger roll layup miss with or without respect to a particular player, drawings a personal foul with or without respect to a particular player, attempt a regular free throw 1 of 1 with or without respect to a particular player, make a regular free throw 1 of 1 with or without respect to a particular player, miss a regular free throw 1 of 1 with or without respect to a particular player, stoppage for an equipment malfunction with or without respect to a particular player, instant replay upholding call, and instant replay overturning call.

5. The in-game bingo system of claim 1, wherein the card is assigned randomly.

6. The in-game bingo system of claim 1, wherein the card includes a grid containing a plurality of cells with each cell being associated with a possible occurrence of an event in an underlying game.

7. The in-game bingo system of claim 1, wherein the event occurrence data includes an identification of an actual occurrence in an underlying game.

8. The in-game bingo system of claim 1, wherein an award is a prize allocated to an underlying game.

9. The in-game bingo system of claim 1, wherein the one or more user devices is a handheld mobile device comprising a display.

10. The in-game bingo system of claim 1, wherein an underlying game is a sporting event, a match, a competition, or a video game.

11. The in-game bingo system of claim 1, wherein the central gaming server includes a memory having instructions stored thereon that when executed by the game processor, further cause the game processor to:

receive at least one wager input from one or more user devices; and facilitate a delivery of an award to a player having a bingo card which achieved the preset winning pattern.

12. The in-game bingo system of claim 1, wherein the game processor is further caused to:

receive an indication of swiping at a user computing device of the one or more user computing devices;

cause display, responsive to the received indication and at the user computing device, of an event image separate from the plurality of cells, wherein the event image indicates a last actual occurrence of an in-game event of the plurality of in-game events;

receive a selection of the displayed event image; and automatically record a cell location on a virtual bingo card of the user computing device in response to the selection of the displayed event image.

13. The in-game bingo system of claim 1, wherein the game processor is further caused to:

receive an indication of a payment received via a user computing device of the one or more user computing devices; and modify at least one cell of the plurality of cells associated with the virtual bingo card of the user computing device responsive to the indication of the payment, wherein modifying the virtual bingo card includes changing a location of the at least one cell or substituting a different cell for the at least one cell.

14. A method for conducting in-game bingo system for playing an in-game bingo game based on event occurrence data of a game, the method comprising:

providing a central gaming server that receives data regarding actual occurrences of in-game events during a sporting event, the central gaming server including at least one gaming device memory device storing a gaming program and a game processor that executes the gaming program;

receiving at least one input from one or more user computing devices;

assigning a virtual bingo card to each of the one or more user computing devices, each virtual bingo card containing a plurality of cells, each cell being associated with at least one possible occurrence of an in-game event of a plurality of in-game events in the sporting event;

receiving event occurrence data from an in-game event server that receives data regarding actual occurrences of the plurality of in-game events during the sporting event;

causing display, at the one or more user computing devices, of an image separate from the plurality of cells, wherein the image indicates an actual occurrence of an in-game event of the plurality of in-game events during the sporting event;

receiving a selection of the displayed image;

processing the event occurrence data regarding the actual occurrence of the in-game event of the plurality of in-game events during the sporting event to determine whether the actual occurrences matches one or more of the possible occurrences;

recording a location on the virtual bingo card of each of the one or more user computing devices based on an occurrence that matches an actual occurrence identified by the event occurrence data, wherein at least one location is recorded automatically in response to the received selection of the displayed image;

modifying a display of the matched cells on the computing device on the virtual bingo card to indicate the determined match between the in-game events and the possible occurrences of a respective cell;

comparing the recorded locations to a preset winning pattern of cells to determine if the preset winning pattern is achieved;

facilitating a provision of an award to any of the one or more user computing devices having a card that matches the preset winning pattern using the actual occurrences from multiple in-game events of the plurality of in-game events; and awarding winners of the in-game bingo game during the sporting event when the preset winning pattern is achieved using the actual occurrences in the event occurrence data from the multiple in-game events in the plurality of in-game events.

15. The method of claim 14, wherein the card is assigned randomly.

16. The method of claim 14, wherein the card includes a grid containing a plurality of cells with each cell being associated with a possible occurrence of an event in an underlying game.

17. The method of claim 14, wherein the event occurrence data includes an identification of an actual occurrence in an underlying game.

18. The method of claim 14, wherein the award is a prize allocated to an underlying game.

19. The method of claim 14, wherein the one or more user devices is a handheld device comprising a display.

20. The method of claim 14, wherein an underlying game is a sporting event, a match, a competition, or a video game.

21. A bingo wagering game method associated with a sporting event, the method comprising:

accessing a central gaming server that receives data regarding actual occurrences of in-game events during a sporting event, the central gaming server including at least one gaming device memory device storing a gaming program and a game processor that executes the gaming program;

receiving wager input from one or more players of the wagering game via one or more user computing devices of the one or more players, wherein the wager input includes an indication of a number of one or more unit wagers and an assignment of a bingo card, wherein the bingo card includes a grid containing a plurality of cells with each cell being associated with at least one possible occurrence of an in-game event of a plurality of in-game events in the sporting event;

receiving event occurrence data from an in-game event server that receives data regarding actual occurrences of the plurality of in-game events during the sporting event;

causing display, at the one or more user computing devices, of an image separate from the plurality of cells, wherein the image indicates an actual occurrence of an in-game event of the plurality of in-game events in the sporting event;

receiving a selection of the displayed image;

processing the event occurrence data during the sporting event to determine whether the actual occurrences matches one or more of the possible occurrences;

recording cell locations on the bingo cards of each player for determined cells associated with the possible occurrences that match actual occurrences identified by the event occurrence data, wherein at least one cell location of the recorded cell locations is recorded automatically in response to the received selection of the displayed image;

modifying a display of the matched cells on the computing device on the virtual bingo card to indicate the determined match between the in-game events and the possible occurrences of a respective cell;

comparing the recorded cell locations to a preset winning pattern of cells to determine if the preset winning pattern is achieved;

facilitating delivery of an award to a player having a bingo card which achieved the preset winning pattern; and awarding winners during the sporting event when the preset winning pattern is achieved using the event occurrence data.

22. The in-game bingo system of claim 21, wherein the sporting event is selected from one or more of: basketball, football, XFL, Rugby, golf, soccer, hockey, Mixed Martial Arts/Ultimate Fighting Championship, and tennis.

23. The in-game bingo system of claim 21, wherein event occurrence data from the sporting event includes one or more of: first team lineup change, second team lineup change, a result of an interaction between two opposing players, any scoring attempt, or any successful event.

24. The in-game bingo system of claim 21, wherein the in-game bingo system is in communication with a casino gaming system.

25. The in-game bingo system of claim 21, wherein the in-game bingo system is in communication with a non-casino sporting environment.

26. The in-game bingo system of claim 21, wherein the in-game bingo system is in communication with a non-casino sporting social website.

27. A bingo wagering game system associated with a sporting event, the bingo wagering game system presenting gaming functions via a video touch screen display of a gaming device, the system comprising:

a plurality of input devices including:

(a) an acceptance interface that facilitates acceptance of monetary funds; and (b) a payout interface actuatable to cause an initiation of a payout associated with a winning account balance;

a central gaming server that receives data regarding actual occurrences of in-game events during a sporting event, the central gaming server including at least one gaming device memory device storing a gaming program and a game processor that executes the gaming program, and causes the game processor to:

receive wager input from one or more players of the wagering game via one or more user computing devices of the plurality of input devices, wherein the wager input includes an indication of a number of one or more unit wagers and an assignment of a bingo card, wherein the bingo card includes a grid containing a plurality of cells with each cell being associated with at least one possible occurrence of an in-game event of a plurality of in-game events in the sporting event;

receive event occurrence data from an in-game event server that receives data regarding actual occurrences of the plurality of in-game events during the sporting event;

cause display, at the one or more user computing devices, of an image separate from the plurality of cells, wherein the image indicates an actual occurrence of an in-game event of the plurality of in-game events in the sporting event;

receive a selection of the displayed image;

process the event occurrence data during the sporting event to determine whether the actual occurrence of the in-game event of the plurality of in-game events matches one or more of the possible occurrences;

record cell locations on the bingo cards of each player for determined cells associated with possible occurrences that match actual occurrences identified by the event occurrence data, wherein at least one cell location of the recorded cell locations is recorded automatically in response to the received selection of the displayed image;

modify a display of the matched cells on the computing device on the virtual bingo card to indicate the determined match between the in-game events and the possible occurrences of a respective cell;

compare the recorded cell locations to a preset winning pattern of cells to determine if the preset winning pattern is achieved;

facilitate delivery of an award to a player having a bingo card which achieved the preset winning pattern; and award winners during the sporting event when the preset winning pattern is achieved using the event occurrence data.

28. The in-game bingo system of claim 27, wherein the sporting event is selected from one or more of: basketball, football, XFL, Rugby, golf, soccer, hockey, Mixed Martial Arts/Ultimate Fighting Championship, and tennis.

29. The in-game bingo system of claim 27, wherein event occurrence data from the sporting event includes one or more of: first team lineup change, second team lineup change, a result of an interaction between two opposing players, any scoring attempt, or any successful event.

30. The in-game bingo system of claim 27, wherein the in-game bingo system is in communication with a casino gaming system.

31. The in-game bingo system of claim 27, wherein the in-game bingo system is in communication with a non-casino sporting environment.

32. The in-game bingo system of claim 27, wherein the in-game bingo system is in communication with a non-casino sporting social website.

* * * * *